(12) United States Patent
Kolokotronis

(10) Patent No.: US 9,893,410 B2
(45) Date of Patent: Feb. 13, 2018

(54) APPARATUS AND METHOD FOR ACCURATE AND PRECISE POSITIONING OF CELLULAR ANTENNAS

(71) Applicant: FASMETRICS S.A., Attiki (GR)

(72) Inventor: Dimitris Kolokotronis, Athens (GR)

(73) Assignee: Fasmetrics S.A., Athens (GR)

( * ) Notice: Subject to any disclaimer, the term of this patent is extended or adjusted under 35 U.S.C. 154(b) by 203 days.

(21) Appl. No.: 14/401,903

(22) PCT Filed: May 15, 2013

(86) PCT No.: PCT/EP2013/060107
§ 371 (c)(1),
(2) Date: Nov. 18, 2014

(87) PCT Pub. No.: WO2013/171291
PCT Pub. Date: Nov. 21, 2013

(65) Prior Publication Data
US 2015/0144758 A1 May 28, 2015

(30) Foreign Application Priority Data
May 18, 2012 (GB) .................................. 1208818.3

(51) Int. Cl.
*H01Q 1/12* (2006.01)
*H01Q 3/00* (2006.01)
*H01Q 3/04* (2006.01)
*H01Q 1/24* (2006.01)
*H04W 88/08* (2009.01)

(52) U.S. Cl.
CPC ............ *H01Q 1/125* (2013.01); *H01Q 1/1228* (2013.01); *H01Q 1/1242* (2013.01); *H01Q 1/246* (2013.01); *H01Q 3/005* (2013.01); *H01Q 3/04* (2013.01); *H04W 88/08* (2013.01); *Y10T 29/49016* (2015.01)

(58) Field of Classification Search
CPC ........................... H01Q 1/1235; H01Q 1/1228
See application file for complete search history.

(56) References Cited

U.S. PATENT DOCUMENTS 5,065,969 A 11/1991 McLean
6,283,425 B1 * 9/2001 Liljevik ................. H01Q 1/125
248/218.4

(Continued)

FOREIGN PATENT DOCUMENTS

CN 202004144 U 10/2011
DE 9010416 U 11/1990

(Continued)

OTHER PUBLICATIONS

Search Report issued in connection with GB Application No. 1208818.3 and dated Sep. 14, 2012.

(Continued)

*Primary Examiner* — Shawki S Ismail
*Assistant Examiner* — Muhammad S Islam
(74) *Attorney, Agent, or Firm* — Reichel Stohry LLP; Natalie J. Dean; Mark C. Reichel

(57) ABSTRACT

An antenna mounting apparatus (10) in which an antenna bracket (32) can be rotated relative to a mount (20) in an azimuth direction and is selectively, automatically locked in position.

20 Claims, 31 Drawing Sheets

(56) References Cited

U.S. PATENT DOCUMENTS

| | | | | |
|---|---|---|---|---|
| 6,559,806 | B1* | 5/2003 | Watson | H01Q 3/02 343/758 |
| 6,809,702 | B2* | 10/2004 | Safakhah | H01Q 1/1207 343/880 |
| 2003/0201947 | A1* | 10/2003 | Boucher | H01Q 1/125 343/890 |
| 2005/0200522 | A1 | 9/2005 | Boucher | |
| 2008/0258971 | A1* | 10/2008 | Nichols | H01Q 1/125 342/359 |
| 2009/0021447 | A1 | 1/2009 | Austin et al. | |
| 2009/0128433 | A1 | 5/2009 | Lawlor et al. | |
| 2009/0195467 | A1* | 8/2009 | Vassilakis | H01Q 1/1228 343/765 |
| 2010/0231450 | A1* | 9/2010 | Le Sage | H01Q 1/125 342/359 |
| 2010/0296278 | A1* | 11/2010 | van den Dool | A01G 7/045 362/231 |
| 2011/0225804 | A1 | 9/2011 | Clifford et al. | |
| 2011/0285584 | A1 | 11/2011 | Le Sage | |

FOREIGN PATENT DOCUMENTS

| | | |
|---|---|---|
| EP | 1753075 | 2/2007 |
| GB | 0325983 | 3/1930 |
| GB | 2251521 | 7/1992 |
| GB | 2326910 | 1/1999 |
| GB | 2474605 | 4/2011 |
| JP | 11225010 | 8/1999 |
| JP | 11234011 | 8/1999 |
| KR | 1020110063907 | 6/2011 |
| WO | WO 00/46872 | 8/2000 |
| WO | WO 2008/154514 | 12/2008 |

OTHER PUBLICATIONS

International Search Report and Written Opinion issued in connection with PCT/EP2013/060107 and dated Nov. 28, 2013.

* cited by examiner

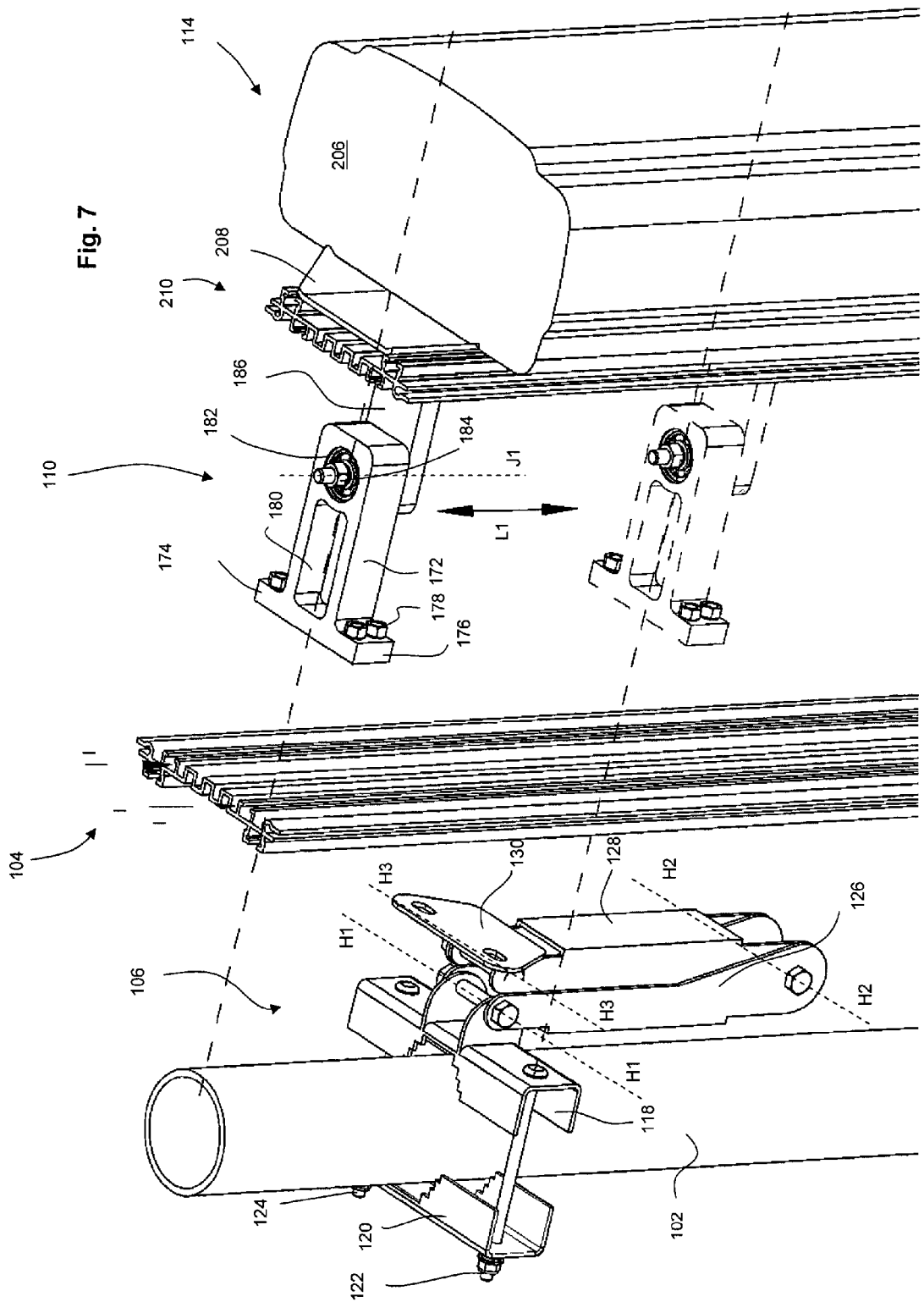

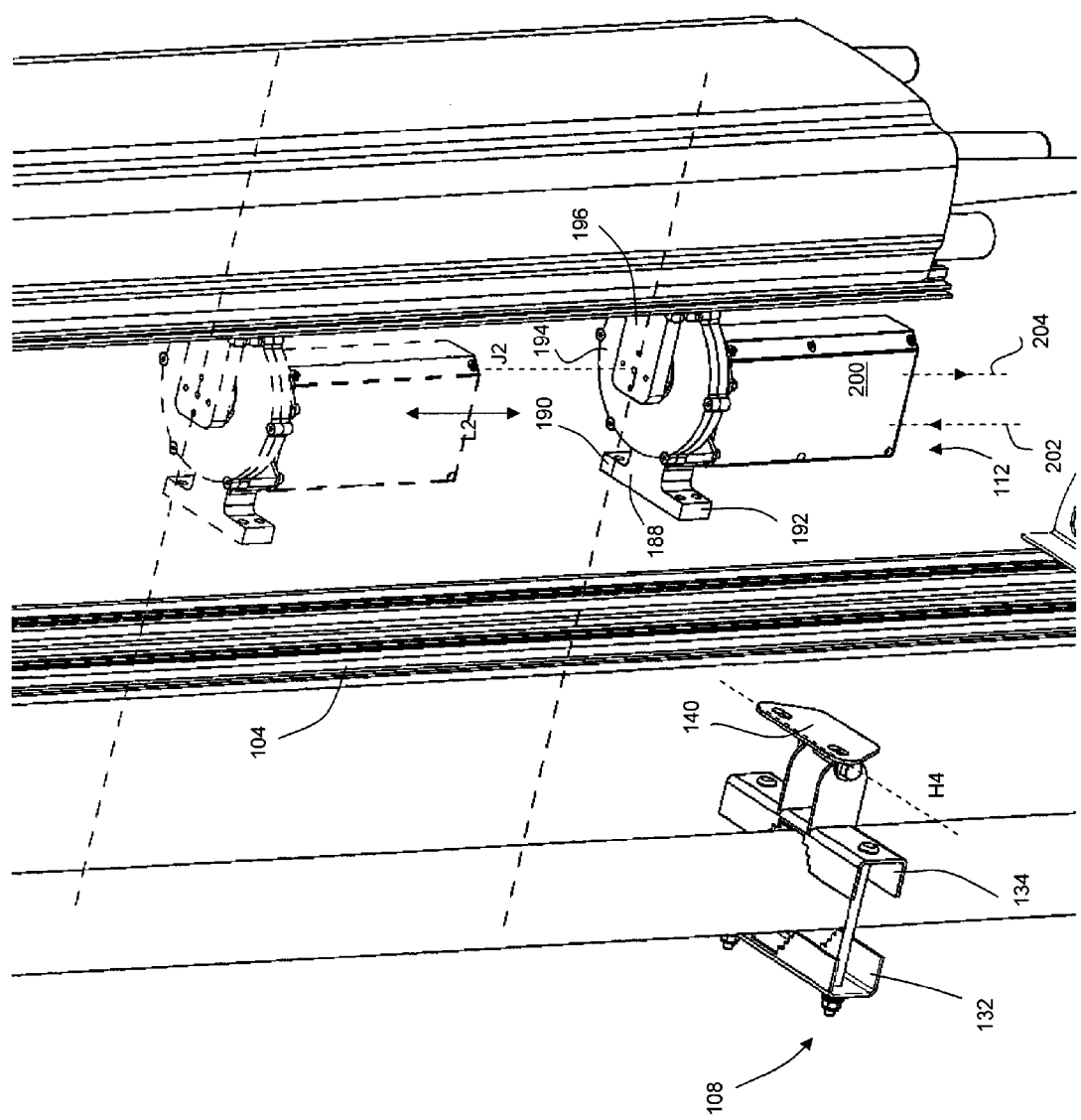

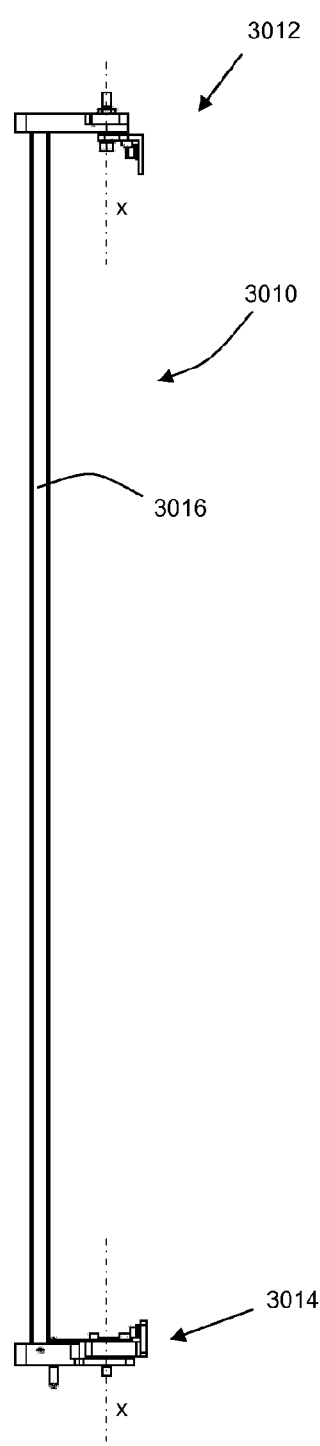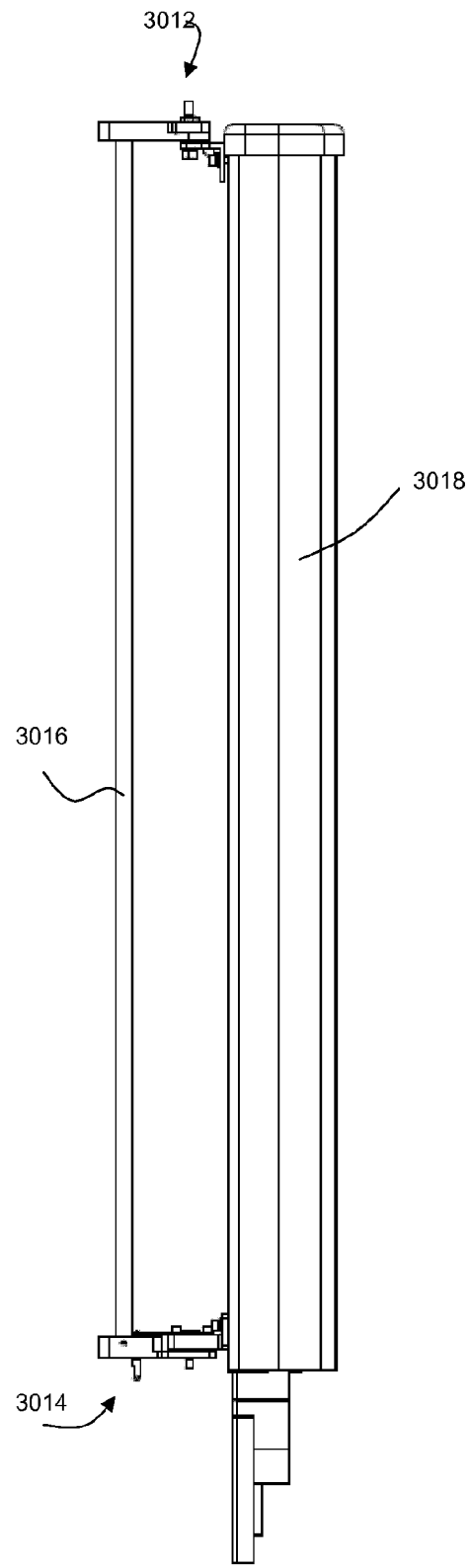
Fig. 15a
Fig. 15b

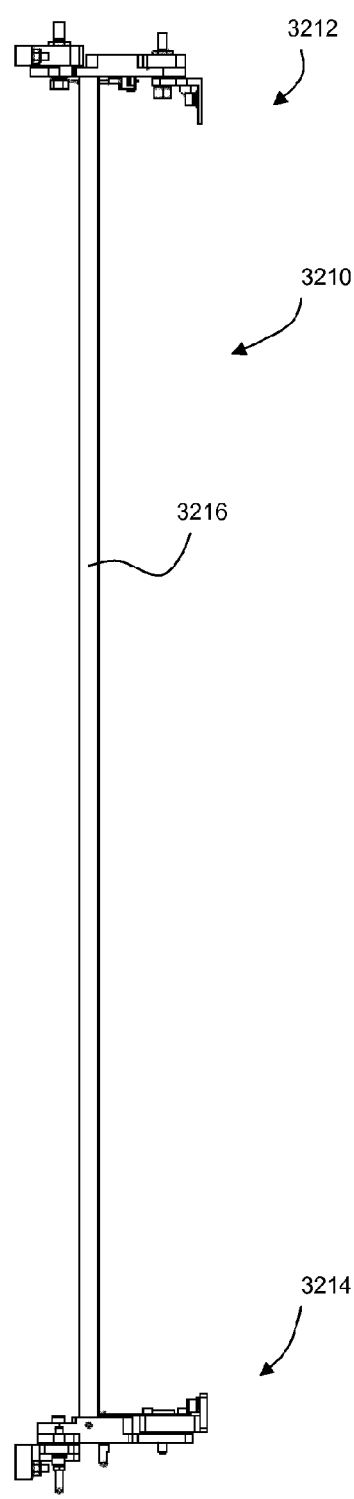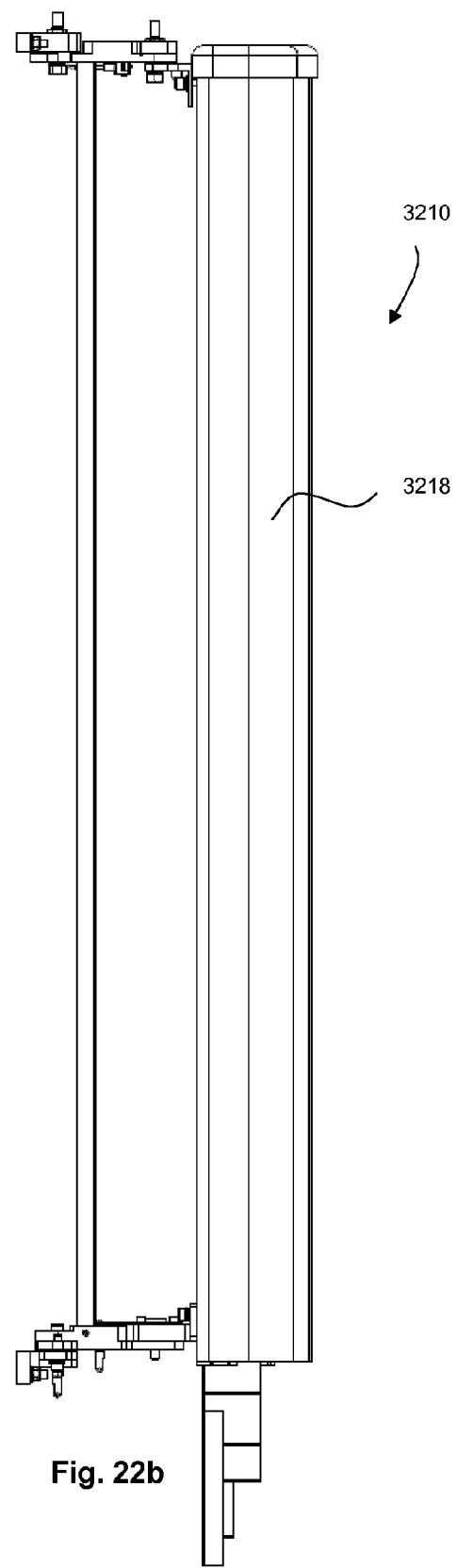
Fig. 22a
Fig. 22b

APPARATUS AND METHOD FOR ACCURATE AND PRECISE POSITIONING OF CELLULAR ANTENNAS

The present invention is concerned with an apparatus and method for the accurate and precise positioning of antennas. More specifically, the present invention is concerned with an apparatus and method which facilitates accurate and precise positioning of cellular antennas to specifications set by a network operator.

Cellular antenna structures are used by cellular communications networks and service providers to mount antenna systems at a desired height from the ground for uninterrupted transmission and reception of cellular radio signals between the antenna system and a mobile device operated by a user.

A typical antenna base station structure is shown in FIG. 1, and comprises a tower or pole 1 and one or more axially spaced antenna support brackets 2 attached to the tower or pole 1. Attached to the brackets 2 and parallel to the pole 1 there is provided an antenna support 3, which is elongate and tubular. A hinged tilt bracket 4 and a joint 5 are attached to the antenna support 3 in axially spaced positions and an antenna 6 attached thereto. The length of the pole therefore determines the height of the antenna 6 from the ground. RF cables 7 are attached to the antenna 6.

Usually, the tower is firstly assembled at the location of installation and then the support brackets are mounted to the tower. The antennas are attached to the support brackets by means of mounting bolts and screws or other securing means, and are manually adjustable in three dimensions (heading (also known as azimuth), tilt and roll).

In order to facilitate this adjustment, the tilt bracket 4 is articulated to allow the top of the antenna 6 to move away from the support 3, and thereby rotate the antenna about the joint 5 (which has a horizontal axis of articulation) to adjust the antenna down-tilt angle. In the event that up-tilt is required then the tilt bracket 4 and the joint 5 can be swapped. The antenna heading (rotation about a vertical axis) can be adjusted by loosening the attachment of the bracket 4 and joint 5 to the support 3 and manually rotating the antenna 6 about the support 3. The antenna roll angle is usually set at zero and typically not adjustable.

The base station shown in FIG. 1 has a single sector (i.e. a single angular region covered by the direction antenna 6), but usually three regions (i.e. three antennas) are provided, each covering 120 degree arcs.

A typical cellular communications antenna is directional, comprising an elongate, planar metal reflector and a series of dipoles positioned in a line along the surface of the reflector. Usually, a cover is used to cover the dipoles in order to environmentally protect them. The cover is configured to be as transparent to electromagnetic radiation as possible in the cellular communications frequency range in order not to affect the antenna radio propagation characteristics. Cover materials having a substantial plastics material component such as GRP or ASA are commonly used.

As cellular networks are deploying broadband technologies for higher data rates (e.g. 3G/4G) the positioning of cellular antennas in a global sense is increasingly important. This is particularly true since broadband technologies are interference limited technologies. This means that higher the signal to interference ratio (C/I), the lower are the maximum data rates that can be achieved. The finite transmitted power from an antenna needs to be accurately directed to the planned target area in order to keep the signal to interference ratio under control. Accurate positioning of antennas reduces unwanted interference between adjacent sectors while directing the maximum signal power where is needed thus achieving minimum signal to interference ratio both inside and outside the target sector.

Capacity oriented network architectures should deploy antennas that can be dynamically adjustable such that their radiation pattern can redirect the finite network bandwidth from one area to another. More advanced antennas are remotely adjustable via electrical motors (or other means) such that their azimuth and tilt angles can be adjusted in order to provide the best possible coverage. For example if a large number of users are in a certain area then a group of antennas can be realigned such that their respective coverage offers the required capacity for that area. As such, it is very important that the absolute direction of the antenna is known, so that its position can be accurately adjusted.

Desired antenna position is usually determined through a radio planning process, carried out by the network operator. This process provides details of the desired global position of the antenna, as well as specific values of heading, tilt and roll.

To achieve high network performance, provide high quality radio link transmissions and reception and ensure high spectrum efficiency, directional antennas must be aligned with minimum inaccuracy (less than ±1°) in the degrees of freedom (heading, tilt and roll). Accurate alignment of directional antennas is of paramount importance in a competitive wireless communication industry, as even small errors in azimuth and tilt alignment (more than ±5° for azimuth and more than ±1° for tilt) can seriously degrade radio network quality.

Several prior art solutions are currently available for antenna alignment purposes. For example, US20090021447 and US20110225804 each describe devices for measuring the orientation of an antenna in three degrees of freedom, i.e. heading, tilt and roll. The devices are directly secured to an antenna by a technician, rigger or climber and display the measurements performed in real time allowing the user to accurately align an antenna to the desired directions.

One deficiency of these prior art devices is that they need to be operated by a technician, rigger or climber at the location of the antenna. As a result, the use of the measurement devices described in US20090021447 and US20110225804 always need to be operated by a user in real time. Every time the antenna needs to be adjusted, the technician, rigger or climber needs to scale the tower, mount the system to the antenna and carry out the required adjustment.

Such devices are also very expensive (many thousands of Euros), and as such cannot be permanently mounted on antennas as this would significantly increase unit cost, and therefore the capital expenditure (CAPEX) of the operator.

Measurement uncertainty is the sum of systematic and random uncertainties introduced in the measurement process. Systematic uncertainties are introduced from a measurement device while random uncertainties are introduced from the method followed by operating the measurement device and collecting and interpreting the measurement results (i.e. human error in use of the device). The measurement devices described in US20090021447 and US20110225804 cannot exclude the human error introduced in the measurement process because they need to be operated at the antenna location by a technician, rigger or climber. The also need to be affixed to the antenna in the correct manner each time adjustment is required. This is generally undesirable.

Furthermore, due to the modern networks' dynamic nature, repeatable antenna azimuth and tilt re-adjustment during the lifecycle of a base station site (for one or more antenna systems) is required; therefore, the antenna brackets, the antennas or the antenna structure itself should be capable of facilitating such needs. Antenna azimuth and tilt readjustment has to be performed with the same high degree of accuracy as the original installation.

Antenna azimuth and tilt re-adjustment should ideally take place without the need to climb on the tower top and manually adjust the antenna position. Manual reposition involves high operational expenditure (OPEX) due to climbing, as well as health and safety risks for antenna technicians, riggers and climbers. It is also desirable to reduce human exposure to the strong electromagnetic fields proximate the antennas. At present, most network operators inhibit antenna operation during the time that such works are performed on the antenna system, thus preventing coverage from the selected antenna and/or base station. This is also undesirable.

As discussed, the devices disclosed in US20090021447 and US20110225804 do not disclose remote (only local) re-adjustment of the antenna orientation. However, should remote re-adjustment be used, this requirement cannot be satisfied by this prior art.

A prior art antenna that offers built-in remote azimuth and tilt adjustment by electromechanical actuation and provide heading, tilt and roll measurement means is disclosed on US20090195467. A problem with this prior art is that the adjustment mechanism is integrated with the antenna itself. This forces the operator to adopt one type of antenna, and also forces them to invest in a new antenna. Preferably, the operator should be able to select the appropriate antenna for its radio characteristics in the first instance.

A further problem encountered by modern cellular antennas is in the use of the MIMO (multiple input multiple output) protocol. This type of smart antenna technology currently uses arrays of cross polarized dipoles to form multiple antennas under the same housing (radome) in order to increase data bandwidth performance due to better exploitation of both transmit and receive de-correlated RF paths (polarization diversity transmission and reception). Such antennas, although offering high spectrum efficiency, are difficult to install on the antenna structure due to their physical dimensions, complexity of installation and aesthetics. Furthermore, antennas supporting MIMO technology for various configurations (i.e. 2×2, 4×4, etc) are significantly more expensive than the legacy cross polarized antennas used today.

Another disadvantage of the prior art MIMO antenna technology is that due to their size, steering capability of the antenna radiation pattern cannot be easily achieved with electromechanical actuation. This results in an inherent limitation of the antenna technology as it cannot satisfy the modern networks' dynamic needs, where repeatable antenna azimuth and tilt re-adjustment during the lifecycle of a base station site (for one or more antenna systems) is required.

Alternative use of the MIMO technique deployment requires the de-correlation to be achieved by spacing dipoles apart (horizontally or vertically, by a specified distance in wavelengths ($\lambda$)—distance depends on both MIMO performance requirements as well as other parameters such as RAN technology used and modulation/coding schemes) in order to achieve increased data bandwidth performance due to better exploitation of both transmit and receive de-correlated RF paths (space diversity transmission and reception). In order to manage best possible de correlation effects by spacing, two or more antennas need to be spaced apart in such a way that two antennas should point in exactly the same 3 dimensional direction having known distance in wavelengths ($\lambda$) to each other. This is required for the de-correlation to take maximum effect per performance targets and technology deployed MIMO technique deployment by spacing dipoles (or antennas) apart with high precision mapping in three degrees of freedom (heading, tilt and roll) for two antennas at a distance apart can be challenging for antenna technicians, riggers or climbers (for the reasons discussed above). Furthermore, accurate fixation of two antennas at a specified horizontal or vertical distance in wavelengths ($\lambda$) whilst also achieving precise parallelism and/or verticality to each other is also challenging. The aforementioned installation problems, when attempting high precision positioning and alignment of two or more antennas for MIMO technique deployment by spacing, is generally difficult (if not impossible) to handle with today's installation practice and tools.

A further problem with directing antennas in the desired direction, in particular by remote actuation, is "play", or free movement, in the actuation system. The use of electric motors and gear trains results in some inevitable backlash which can cause the antenna to move in use. In particular worm gears (which offer an advantage in gearing) have typically high backlash.

A problem with existing antenna installations is the fact that they are generally exposed to the external environment, i.e, repeated cyclical wind loading on the antenna. The repeated buffeting of the antenna over time may cause wear in the antenna mounting components, in particular if a remotely driven antenna is provided. Therefore the life cycle of these components is limited. One solution is to cover the entire assembly with a radome, however this restricts the space available requiring any adjustment mechanism to be integrated with the antenna itself.

GB2251521A discloses an orientation adjusting device for an antenna which uses a worm gear. A problem with such arrangements is that backlash can be a problem, and complex mechanical modifications to the drive train (such as that disclosed in the document) are required to alleviate backlash, adding cost and complexity to the assembly. Also, wind loading on the antenna acts to repeatedly and/or continuously back drive the drive mechanism imposing the risk of failure over time. Although worm gears cannot be back driven, the gears have to be over engineered to cope with the induced stresses from e.g. wind loading, and in the case of backlash the potential repeated, small movements (which may cause fatigue). In the case of a gearbox, this means that the gears become significantly larger and heavier than they would otherwise need to be.

A still further problem with remote actuation of antennas is that the electrical specifications defined by industry standards set maximum currents for the operations to be performed on the antenna and associated devices. This limits the size of the motor to be used for high torque applications, and necessitates a gearbox so that a smaller, lower current motor can be used, which in turn introduces further cost and complexity into the system. As such, in a case that a remote actuation system needs to be compliant to the industry standards, the proper balance between the motor and the gearbox size need to be accounted in order to satisfy the application.

DE9010416U1 discloses an antenna mounting apparatus which is configured to adjust the tilt angle of the antenna using a number of holes at the top bracket to manually secure the antenna in position.

EP1753075A1 discloses an antenna mast in which the azimuth of each antenna can be altered by manual rotation about a pivot point. The antenna may be secured in position by aligning a hole on the antenna bracket with one of several holes on the mast, and the user passing a bolt (secured by a nut) through the aligned holes to secure the antenna. A problem with this invention is that positive user intervention is required to secure the antenna in place. As such, user error can result in an unsecured antenna.

WO 00/46872 also uses a bolt with an array of holes to manually position and lock the azimuth of the antenna.

It is an object of the present invention to provide an improved apparatus and method for accurately mounting and adjusting the position of cellular antennas whilst overcoming, or at least alleviating, the above-referenced problems.

In accordance with a first aspect of the invention, there is provided a method of modifying an existing cellular antenna base station, comprising the steps of:
providing an existing cellular antenna base station comprising a mast;
attaching a reference frame to the mast;
providing a global orientation and position measurement device;
attaching the global orientation and position measurement device to the reference frame;
measuring the global orientation and position of the reference frame using the global orientation and position measurement device;
removing the global orientation and position measurement device from the reference frame;
providing an antenna mounting assembly having an antenna bracket, the antenna mounting assembly configured to allow movement of the antenna bracket relative to the reference frame, the antenna mounting assembly comprising a sensor configured to measure the relative movement of the antenna bracket to the reference frame;
attaching an antenna to the antenna bracket.

The invention provides a significant advantage in the field of antenna installation because it combines the ability to provide adjustable antenna orientation and position without requiring the constant or repeated presence of an expensive global orientation and position measurement device. Advantageously, once the position of the reference frame has been determined, the antenna position can be adjusted, and the global orientation of the antenna (e.g. with respect to grid, magnetic or true North) can be determined using a relative position sensor (e.g. an optical/magnetic rotary encoder or an electrical potentiometer) which is inexpensive when compared to the global orientation and position measurement device.

During the above method, the steps of attaching and removing the measurement device are carried out with the reference frame in the same position—i.e. the reference frame does not need to be moved to a specific position because the antenna mounting assembly provides the required movement.

The method may comprise the steps of providing a further antenna and attaching the further antenna to the reference frame, for use in MIMO applications. The antennas may be vertically or horizontally spaced in use.

The existing cellular antenna base station may comprise a down- or up-tilt bracket attached to the mast, and the step of attaching the reference frame to the mast comprises the step of attaching the reference frame to the tilt bracket.

The antenna mounting assembly may comprise tilt and/or roll sensor to determine the absolute tilt and roll of the reference frame which can be used in the calculations to position the antenna. Such tilt and roll sensors are also inexpensive compared to global orientation and position measurement devices.

In many existing cellular antenna base stations, an antenna mount is attached to the tilt bracket, in which case the step of attaching the reference frame to the mast comprises the step of attaching the reference frame to the antenna mount. It is also feasible that the existing cellular antenna base station comprises an antenna attached to the mast—this antenna can be removed, the system according to the invention installed, and the same antenna placed back on the base station. A significant advantage of the present invention is the mitigation of the need to purchase new antennas to achieve optimum and repeatable alignment of the antenna.

Preferably the method comprises the steps of:
providing an azimuth steering assembly;
steering the antenna using the azimuth steering assembly;
determining the absolute heading of the antenna using the measured position of the reference frame combined with data provided by the sensor.

The same method may also apply for tilt and roll steering assemblies.

As mentioned above, the present invention allows for repositioning of the antenna without needing expensive, human operated global positioning systems.

Preferably the method comprises the steps of:
providing an azimuth locking assembly;
locking the antenna bracket relative to the reference frame using the locking assembly.

The same method may also apply for tilt and roll locking assemblies.

Advantageously this avoids the need for a large motor and/or gearbox to resist wind loading, and also avoids misalignments due to motor/gearbox backlash.

According to a second aspect of the present invention there is provided an antenna mounting apparatus comprising:
a first mount,
an antenna mounting bracket attached to the first mount via a first rotational joint to allow azimuth adjustment rotation about a first axis;
the first rotational joint comprising: a first locking mechanism arranged to lock the first rotational joint and a rotary sensor arranged to determine the articulation of the first rotational joint;
wherein the first rotational joint comprises an interface plate defining: a drive interface for articulating the joint, a locking interface for selectively locking the joint using the first locking mechanism and a rotary sensor interface arranged to provide an output reading from the rotary sensor.

The presence of an interface plate with steering, locking and a data connection allows the system to be an upgradeable "plug and play" system. The operator can select whether to provide a manual steering and locking assembly for occasional antenna adjustment, or an automated assembly for frequent, automated remote alignment.

The integral rotary sensor and data output means that a measurement tool is not required—thus reducing errors by manual adjustment. The climber or rigger can simply plug-in a diagnostic tool to read and display the antenna position calculated from the rotary sensor output.

The drive interface may comprise a spline, threaded shaft, flat shaft or the like, capable of transmitting a torque. Preferably the rotational drive formation is a male or female formation for being received in, or for receiving an actuator drive shaft in a mating arrangement.

Preferably each interface of the interface plate faces in a common direction. More preferably the common direction is towards the ground in use. This allows easier access for manual adjustment and/or replacement of the steering and locking mechanism.

Preferably the interface plate defines an actuator mounting formation for attachment of an actuator housing to engage an actuator output shaft with the drive interface in use.

Preferably the first rotational joint comprises a sealed housing containing the first locking mechanism and the rotary sensor. Preferably the sealed housing is sealed to an IP rating, preferably at least IP67. This recognises the fact that the antenna is positioned outside, and may be in a humid, icy, wet, dusty or dirty environment.

Preferably the locking mechanism comprises a first part coupled to the first mount, and a second part coupled to the antenna mounting bracket, which first and second parts comprise selectively alignable formations arranged to be simultaneously engaged by a locking pin to secure the locking mechanism. Preferably one of the first and second parts comprises a series of formations circumferentially spaced around the first axis at a first radius. Preferably the series of formations is a series of locking bores.

A locking arrangement is then provided having an actuable locking pin arranged to move between an unlocked condition, and a locked condition in which it simultaneously engages the first and second parts to lock them together.

Advantageously the ability to lock the parts together aside from the inherent resistance of the motor means that the motor and/or gearbox does not have to react loads on the antenna all the time. In other words a load path between the components is formed separate from the motor shaft. This means that the motor and/or gearbox do not have to be designed to withstand back driving from e.g. wind loading, and the system is resistant to any motor backlash.

The locking pin may be linearly actuable. The locking pin may be resiliently biased to a locked condition. A resilient member may be provided to bias the locking pin to the locked condition.

This type of sprung pin arrangement allows one handed operation of the locking mechanism, as unlike the prior art the locking pin will automatically engage. Further, and advantageously, the locking member will move to a failsafe locked position should an operator forget to ensure that locking has occurred.

The locking arrangement may be manually actuated, or actuated by an electric actuator.

A steering actuator may be provided having an electric actuator arranged to provide a steering torque to the drive interface. A combined steering and locking unit comprising the steering actuator and a locking mechanism configured to engage the locking interface to lock the first rotational joint may also be provided. Such a steering and locking unit should preferably comprise an electrical connector to receive the output reading from the rotary sensor.

There may also be provided a control system configured to:
receive an antenna movement command;
in response to the movement command;
disengage the locking mechanism,
move the mounting bracket with the first steering actuator,
determine the position of the antenna using the output reading, and,
reengage the locking mechanism.

Preferably the assembly comprises a reference frame, in which the first mount is attached to the reference frame. The exact global position and orientation of the reference frame is known, and as described below measured to a high level of accuracy upon installation and subsequent movement.

Preferably the reference frame is an extruded component. This provides a constant profile for mating with adjacent components. It also allows mounting at various positions along the length of the reference frame.

Preferably the reference frame is an extruded plate. The reference frame may also be an extruded pole.

Preferably the reference frame comprises a plurality of channels arranged to receive a fastener of the first mount. Preferably the channels extend along the length of the reference frame, and are configured to capture a fastener head.

It will be understood that the reference frame may be oriented with its main axis vertical or horizontal in use. In the latter case, two MIMO antennas can be mounted side-by-side and co-aligned to a high degree of accuracy.

According to a fourth aspect of the invention there is provided a method of operating a cellular communications antenna comprising the steps of:
providing an antenna mounting system comprising: a mount; an antenna mounting bracket attached to the first mount via a first rotational joint to allow azimuth adjustment rotation about a first axis; an electric motor arranged to drive the antenna in rotation about the first axis; and, a locking mechanism arranged to selectively lock relative rotation between the mount and the antenna mounting bracket;
disengaging the locking mechanism;
engaging the electric motor to rotate the antenna mounting bracket;
holding the antenna bracket in position using the electric motor;
re-engaging the locking mechanism;
disengaging the electric motor.

Advantageously using the motor to hold the antenna mounting bracket in position whilst the locking mechanism actuates keeps the components aligned in the correct position. For example, if the locking mechanism requires a pin to be inserted into a bore, then alignment is paramount, and keeping the motor energised and able to hold the system in place is advantageous.

Using such a locking mechanism also allows for a smaller motor to be used, because the motor is not constantly in use either holding the antenna mounting bracket in place or constantly correcting deviations in antenna position.

This invention alleviates the problem with e.g. wind loading trying to back drive the electric motor.

Preferably the method comprises the steps of:
providing a rotary movement sensor as part of the antenna mounting system;
using the rotary movement sensor in conjunction with the electric motor as part of a control system to hold the antenna bracket in place during the holding step.

Preferably the antenna mounting system is an antenna mounting system according to the second aspect.

According to a fourth aspect of the present invention there is also provided an antenna mounting system comprising:

an antenna mounting apparatus according to the second aspect, and, a further antenna mounting apparatus having:
a further first mount, and,
a further antenna mounting bracket attached to the further first mount via a further first rotational joint to allow azimuth adjustment rotation about the first axis, in which the antenna mounting apparatus and the further antenna mounting apparatus are spaced apart in the direction of the first axis.

Preferably the first mount is attached to a second mount via a second rotational joint to allow azimuth adjustment rotation about a second axis, parallel to and offset from the first axis, such that the first mount is an intermediate member between the second mount and the antenna mounting bracket.

Preferably there is provided a second locking mechanism arranged to inhibit rotation of the first mount and the second mount, which second locking mechanism comprises a second locking pin arranged to selectively and simultaneously engage both the first mount and second mount.

According to a fifth aspect of the present invention there is also provided an antenna mounting system comprising:
an antenna mounting apparatus according to the second aspect,
a further antenna mounting apparatus having:
a further first mount,
a further antenna mounting bracket attached to the further first mount via a further rotational joint to allow azimuth adjustment rotation about the first axis,
a further second mount attached to the first mount via a further second rotational joint to allow azimuth adjustment rotation about the second axis, in which the antenna mounting apparatus and the further antenna mounting apparatus are spaced apart in the direction of the first and second axes.

Various example mounting apparatuses in accordance with the present invention will be provided with reference to the following figures:

FIG. 6b is a section view of the part of the antenna mounting assembly shown in FIG. 6a;

FIG. 6c is a rear view of the part of the antenna mounting assembly shown in FIG. 6a;

FIG. 7 is a close-up view of a part of the antenna mounting assembly of FIG. 2;

FIG. 8 is a further close-up view of another part of the antenna mounting assembly of FIG. 2;

FIG. 15a is a side view of a third antenna mounting apparatus in accordance with the present invention;

FIG. 15b is a side view of the antenna mounting apparatus of FIG. 15a with an antenna installed thereon;

FIG. 16a is a detail, perspective view of a part of the antenna mounting apparatus of FIG. 15a;

FIG. 16b is a detail, perspective view of a further part of the antenna mounting apparatus of FIG. 15a;

FIG. 17 is a schematic of the movement range of the antenna mounting apparatus of FIG. 15a;

FIG. 18a is a perspective view of a part of the antenna mounting apparatus of FIG. 15a;

FIG. 18b is a side section view of the part of FIG. 18a,

FIG. 19b is a perspective top view of the part of the antenna mounting apparatus as shown in FIG. 19a;

FIG. 20b is an exploded perspective view of the part of the antenna mounting apparatus shown in FIG. 20a;

FIG. 21a is a plan view of a first mounting arrangement for the antenna mounting apparatus of FIG. 15a;

FIG. 21b is a plan view of a second mounting arrangement for the antenna mounting apparatus of FIG. 15a;

FIG. 22a is a side view of a fourth antenna mounting apparatus in accordance with the present invention;

FIG. 22b is a side view of the antenna mounting apparatus of FIG. 22a with an antenna installed thereon;

FIG. 23a is a detail, perspective view of a part of the antenna mounting apparatus of FIG. 22a;

FIG. 23b is a detail, perspective view of a further part of the antenna mounting apparatus of FIG. 22a;

FIG. 24 is a schematic of the movement range of the antenna mounting apparatus of FIG. 22a;

Figure 1:
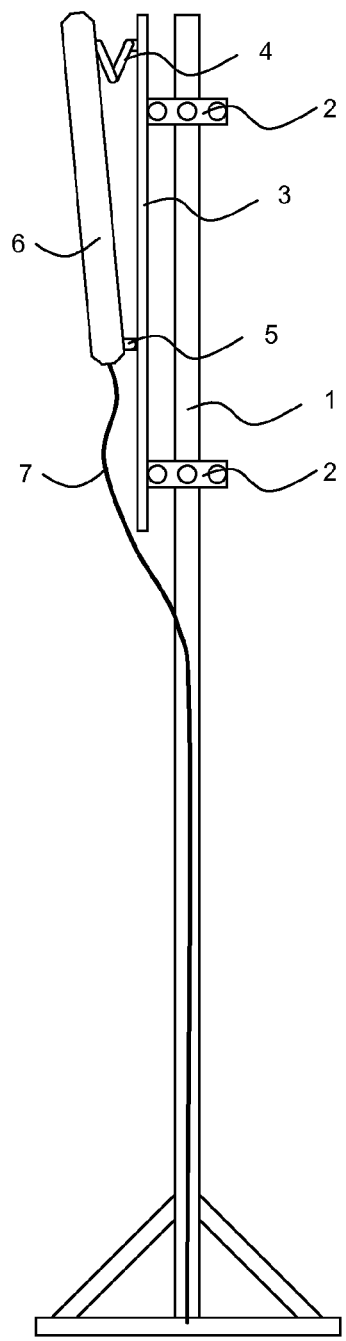
FIG. 1 is a side view of a prior art cellular antenna base station.
Figures 2, 3:
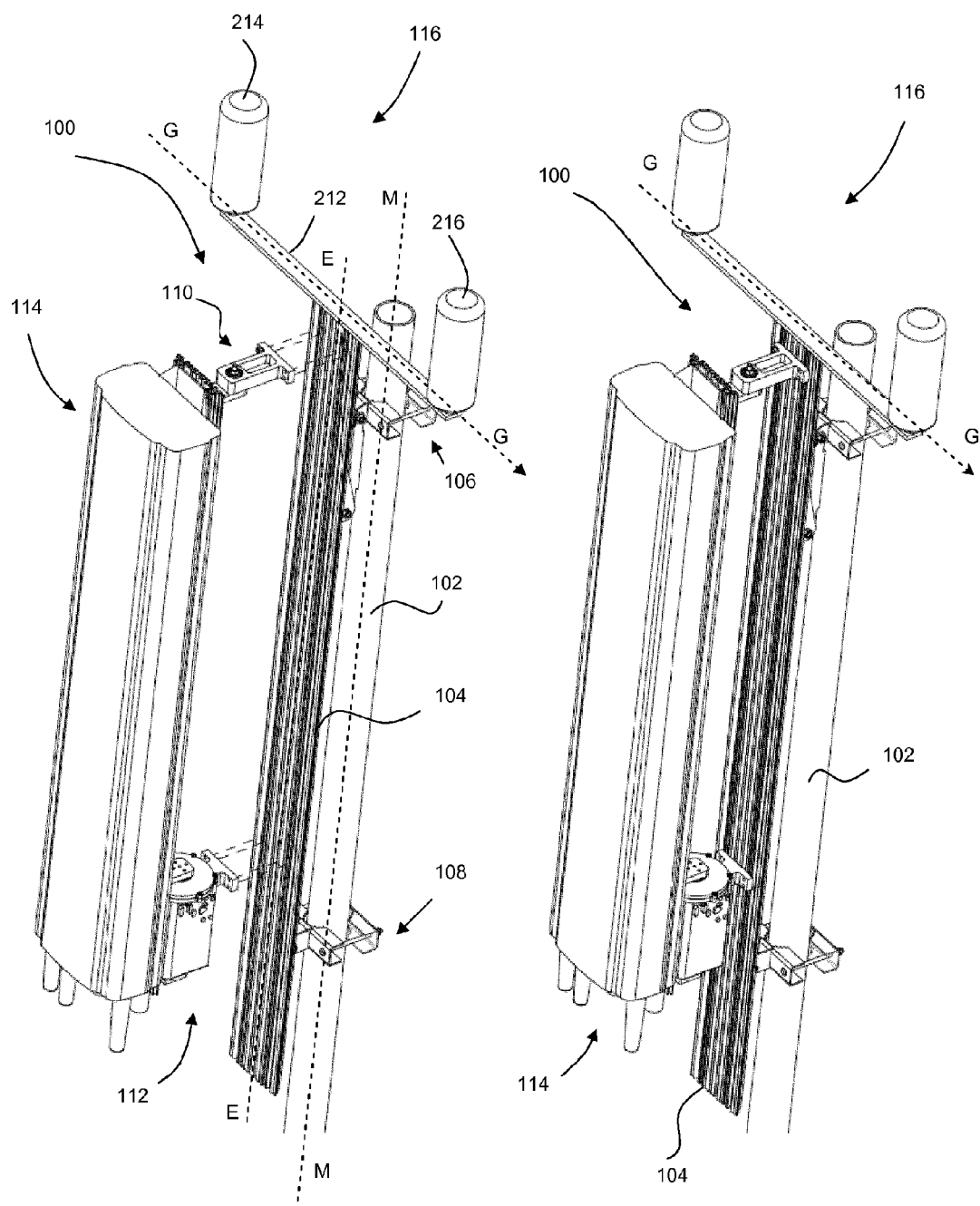
FIG. 2 is a perspective, exploded view of a first antenna mount assembly in accordance with the present invention.
FIG. 3 is a perspective view of the antenna mount assembly of FIG. 2 in an assembled condition.
Figure 4:
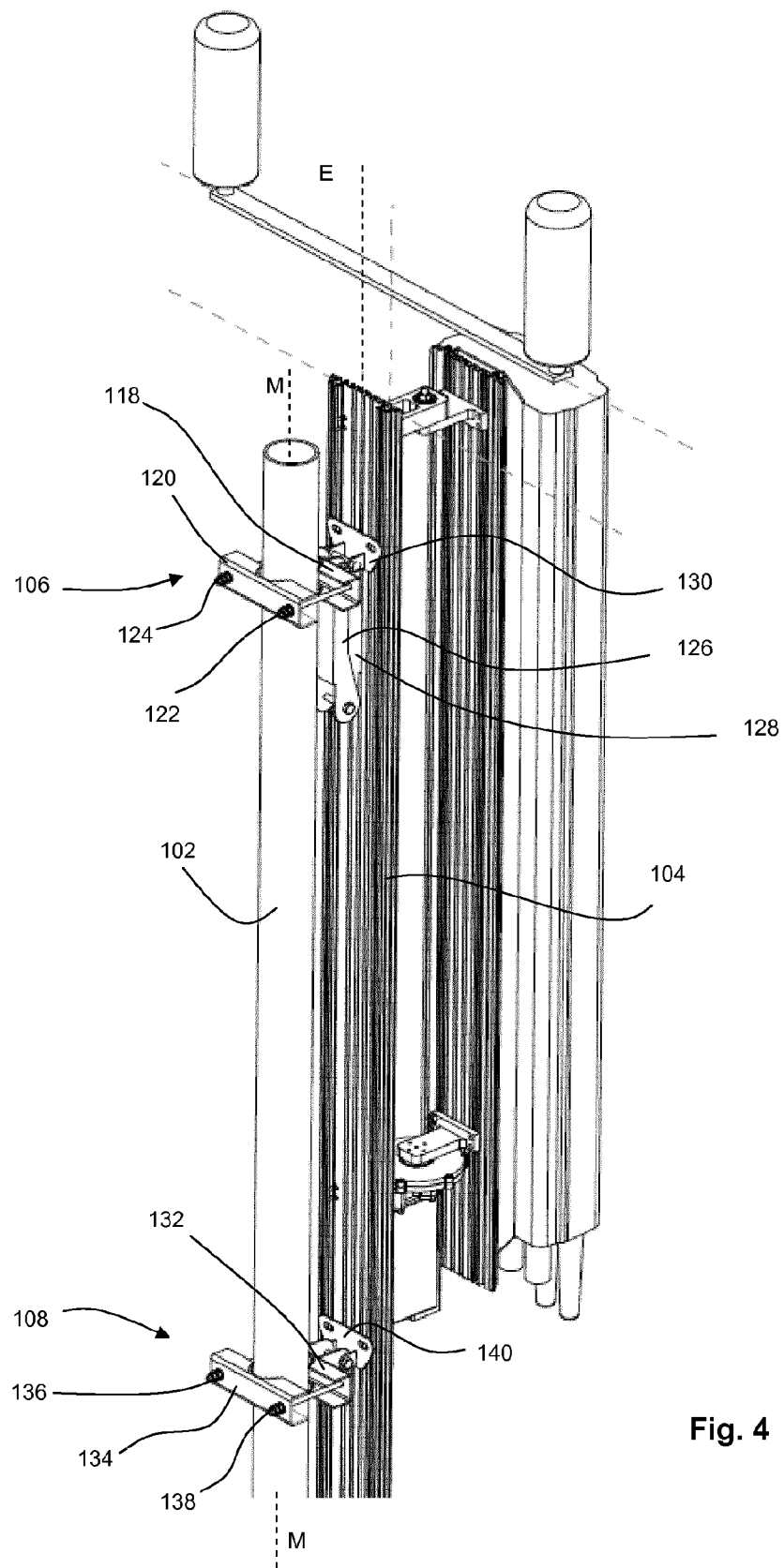
FIG. 4 is a further exploded view of the antenna mount assembly of FIG. 2 from a rear angle.
Figure 5:
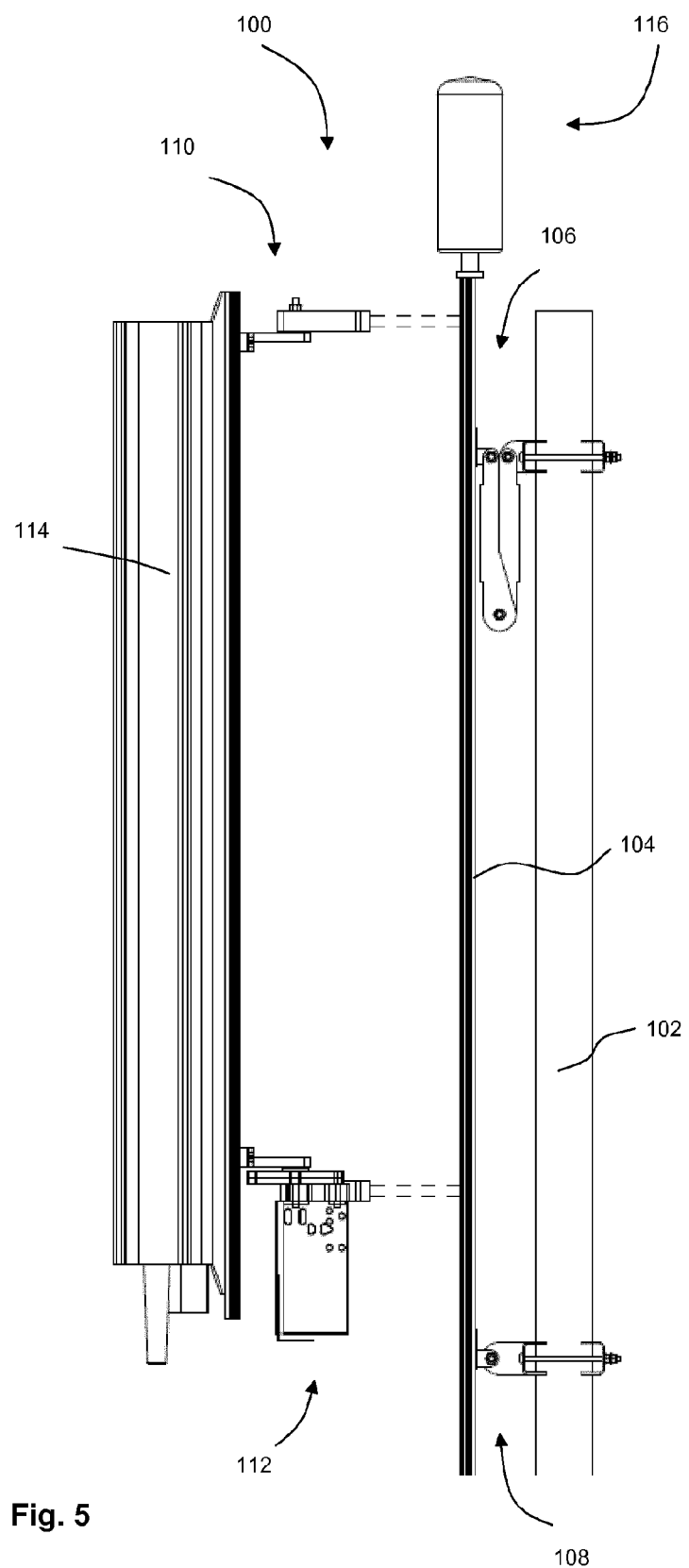
FIG. 5 is a side exploded view of the antenna mount assembly of FIG. 2.

Turning to FIGS. 2 to 9c, there is shown an antenna support 102 to which an antenna assembly 114 has been attached by an antenna mounting assembly 100 according to the present invention. The antenna mounting assembly 100 comprises a reference frame 104, a tilt bracket 106, a hinge 108, a first antenna mount 110 and a second antenna mount 112. A directional GPS (D-GPS) antenna arrangement 116 is also provided for initial installation purposes, but does not form part of the assembly 100 during normal (post-installation) use.

The antenna support 102 is a tubular member (akin to the support 3 of FIG. 1) defining a mast axis M. The antenna support 102 is oriented vertically in use at a height sufficient to provide the required coverage from the antenna assembly 114. In use, the mast support 102 is attached to a mast as described with reference to FIG. 1.

The reference frame 104 is attached to the antenna support 102 via the hinged tilt bracket 106 (equivalent to the prior art tilt bracket 4) and the joint 108 (equivalent to the prior art joint 5). The tilt bracket 106 and joint 108 are better seen in FIGS. 7 and 8 respectively.

The tilt bracket 106 comprises a first clamping member 118, and a second clamping member 120 which are configured to receive the antenna support 102 and are joined at either respective end by threaded rods 122, 124. The rods 122, 124 can be adjusted in order to bring the clamping members 118, 120 closer together in order to clamp the antenna support 102 therebetween. A downwardly depending link arm 126 is provided which is hinged to the first clamping member 118 via a rotational joint having a horizontal axis of rotation H1, perpendicular to the mast axis M. At the free end of the link member 126, a second link member 128 is attached which depends upwardly from the first link member 126 and is attached thereto via a rotational joint having a horizontal axis of rotation H2, parallel to H1. At the free end of the second link member 128 there is provided an attachment plate 130 which is rotatably attached to the second link member 128 for rotation about a horizontal axis of rotation H3, parallel to H1 and H2. An extensible linkage is thereby created in which the horizontal distance between the first clamping member 118 and the attachment plate 130 can be adjusted.

Turning to the joint 108, similarly there is provided a first clamping member 132, a second clamping member 134 and a pair of threaded rods 136, 138 respectively, which are configured to clamp the antenna support 102 between the clamping members 132, 134. In the joint 108, an attachment plate 140 is connected directly to the first clamping member 132 via a rotational joint with a horizontal axis of rotation H4. H4 is parallel to H1, H2 and H3.

The tilt bracket 106 and joint 108 are known in the art, and have traditionally had an antenna directly attached thereto as described with reference to FIG. 1. In the prior art, azimuth adjustment of the antenna is undertaken by loosening the clamps and manually rotating the antenna about the support.

Figure 6A:
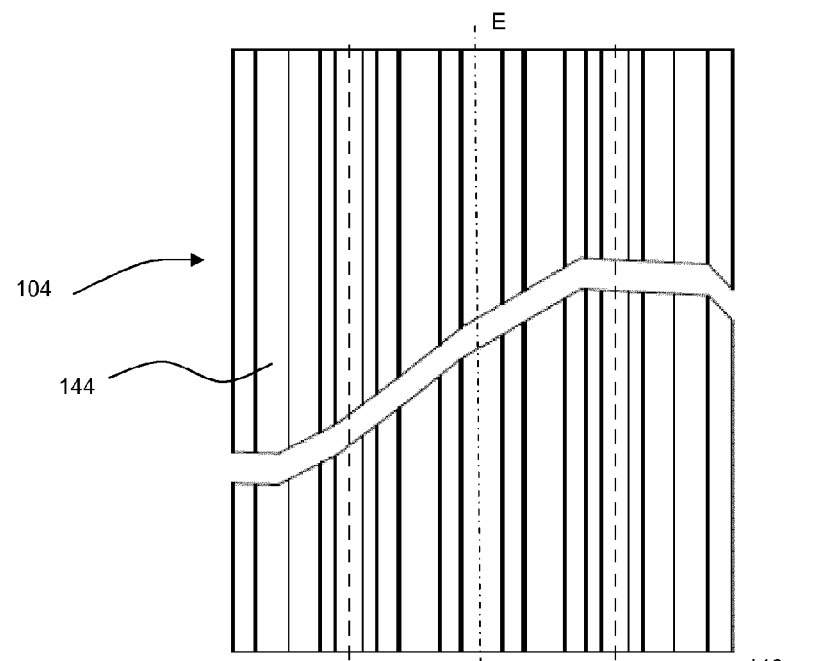
FIG. 6a is a rear view of a part of the antenna mounting assembly of FIG. 2.
Figure 6B:
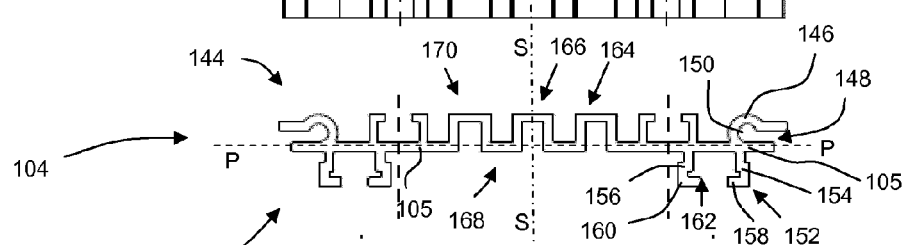
Figure 6C:
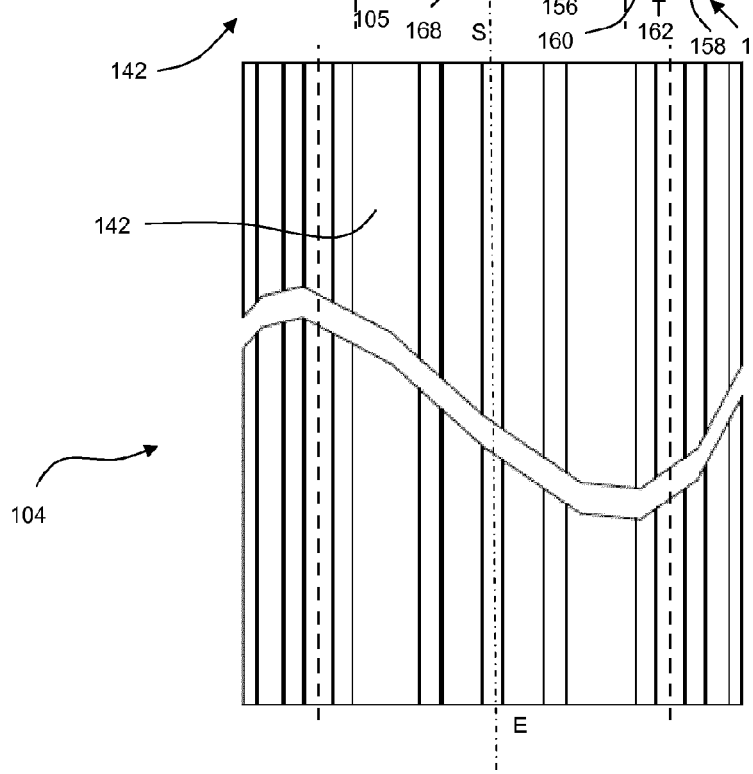

Turning to the reference frame 104, this is shown in more detail in FIGS. 6a to 6c. The reference frame 104 is an elongate, extruded aluminium part of generally planar construction having a long axis E. The reference frame 104 has an antenna support attachment face 142 and antenna attachment face 144 on an opposite side thereof.

A cross section of the reference frame 104 is shown in FIG. 6b. The cross section defines an reference frame plane P on which a planar body part 105 lies, from which various extruded features extend perpendicular thereto. The reference frame 104 is symmetrical about a plane of symmetry S which is perpendicular to the plane P.

At both free ends of the cross section (i.e. along the long edges of the reference frame 104), and extending from the antenna attachment face 144, there is provided a generally c-shaped clamp 146, having a mouth 148 and a partially circular cavity 150 for receiving and clamping a member as will be described below. The clamp 146 is cantilevered to the body part 105 of the member 104 and is resilient.

Moving inwardly towards the plane of symmetry S, on the antenna support attachment face 142, there is provided a bolt retaining channel 152 comprising two side walls 154, 156 extending perpendicular from the planar part 105 of the reference frame 104. Each of the side walls 154, 156 is generally parallel and terminates in a respective end wall 158, 160. A mouth 162 is provided between the end walls 158, 160. It will be noted that the distance between the side walls 156, 154, 156 is greater than the width of the mouth 162 so a bolt head can be captured and retained between the side walls 156, 154 without being pulled out through the mouth 162. Because the channel 152 runs along the length of the reference frame 104, bolts can be slid along it and tightened where required.

Moving inwardly towards the plane of symmetry S, on the antenna attachment face 144, there is provided a channel 164 of substantially the same construction as the channel 152, i.e., configured so as to receive a bolt head. In the centre of the cross section, coincident with and either side of the plane of symmetry S, there are provided three ribs in the form of castellations 166, 168, 170 in the body 105 in order to provide bending and torsional stiffness to the reference frame 104.

The first antenna mount 110 is shown in more detail in FIG. 7. The first antenna mount 110 comprises a first body 172 which is generally rectangular in plan having opposing attachment flanges 174, 176 defined at a first end. Each of the flanges 174, 176 is provided with attachment means in the form of a pair of vertically spaced bolts 178. Each pair of bolts 178 on the respective flange 174, 176. The body 172 comprises a generally rectangular cut-out 180 to reduce its weight.

At an opposite ends of the body 172 to the flanges 174, 176, there is provided a joint receiving formation 182 which is arranged to receive a rotational joint 184 having an axis of rotation J1.

The rotational joint 184 is connected to a second member 186 of the first antenna mount 110. The second member 186 is also generally rectangular in plan and by virtue of the joint 184 is configured to rotate relative to the first member 172 about the joint axis J1. At the opposite end of the second member 186 to the joint 184, the second member 186 defines two oppositely extending flanges receiving bolts in a similar manner to the first member 172. This can be seen in FIG. 7, and will not be described in further detail here.

Turning to FIG. 8, the second antenna mount 112 is shown in detail. The second antenna mount 112 comprises a first member 188 which is similar to the first member 172 of the first antenna mount 110. The first member 188 also comprises flanges 190, 192 and extends to a rotational joint 194. A second member 196 of the second antenna mount 112 is also provided and is generally similar to the second member 186 of the first antenna mount 110. Between the first and second members 188, 196, there is provided a joint 194 which is driven in rotation by a steering and locking unit 200.

The steering and locking unit 200 comprises an electric motor such that the rotational relative position of the first and second members 188, 196 can be adjusted. The steering and locking unit 200 has an input 202 comprising power for the electric motor and motor control signals from a controller (not shown) and an output 202 which outputs the rotational position of the motor and/or joint 194 from an encoder therein. The joint 194 has a joint axis J2 aligned with the joint axis J1 of the first antenna mount 110.

The steering and locking unit 200 is also configured to selectively lock the relative rotational position of the first and second members 188, 196. This locking mechanism (an example of which will be described below) is independent of the motor such that any movement from motor backlash is eliminated.

The steering and locking unit 200 also comprises a rotary encoder such that the relative rotational position of the first and second members 188, 196 can be accurately determined. Because the encoder is only measuring relative position, it can be relatively inexpensive (tens of Euros). In this instance, an optical encoder is used.

Turning back to FIG. 7, the antenna assembly 114 comprises an antenna 206, the antenna being of a known construction, i.e., having a reflector, a series of dipoles and a cover thereover. The antenna 206 is a directional antenna used for cellular communications. The antenna reflector is attached to a connector 208 which is constructed from a sheet metal material and extends the length of the antenna 206. The antenna connector 208 is in turn attached to a backplate 210, by mechanical fasteners in the backplate channels.

The backplate 210 is substantially identical to the reference frame 104. The backplate 210 has an extruded profile having a cross section the same as that shown in FIG. 6b for the reference frame 104. The antenna connector 208 is attached to the side indicated 142 in FIG. 6b.

The backplate 210 has the additional benefit that it further inhibits electromagnetic "leakage" from the rear of the antenna 206 which providing attachment functionality.

Turning to the GPS antenna 116, this is a directional GPS (D-GPS) antenna having a first elongate member 212 oriented along a D-GPS axis G and at each end of the member 212 there is provided a respective GPS antenna 214, 216 which extends in the direction perpendicular to the axis G. The global position of the two GPS antennas 214, 216 can be used to determine the global heading of the axis G of the D-GPS antenna 116. This type of antenna, although it can accurately determine the global position of a component it is attached to, is expensive (tens of thousands of Euros) and as such is used during installation only, as will be described below.

The antenna mounting assembly 100 is assembled as follows.

The two antenna mounts 110, 112 are assembled to the reference frame 104. This is shown in more detail in FIG. 7 in which the first member 172 is attached to the reference frame 104 by using the bolts 178. The heads of the bolts 178 are inserted in direction I into the channels 164 (see FIG. 6b) of the reference frame 104 such that they are slidably moveable in direction L1 as shown in FIG. 7. By tightening the bolts 178 the end wall of the channels 164 can be used to clamp the first member 172 in place. The second antenna mount 112 is attached to the reference frame 104 in a similar manner. Due to the planar abutment of the antenna mounts with the intermediate member, and the location of the bolts 178 in the channels 164, the antenna mounts are installed at a fixed orientation to the reference frame 104. No other relative orientation of the components when attached is possible.

The antenna assembly 114 is attached to the second members 186, 196 of the first and second antenna mounts 110, 112 are attached to the backplate 210 in a similar fashion, i.e., bolts through the respective flange of the second member 186 are clamped into place using the channels defined in the backplate 210.

Because the reference frame 104 and backplate 210 are extruded, and in particular because the bolt-receiving channels therein are elongate, the antenna mounting assemblies 110, 112 can be moved in directions L1 and L2 as required. This allows a variety of different antennas to be used with the present invention.

The invention is particularly well suited to retrofit to existing base station locations, and provides the aforementioned advantages without significantly increasing CAPEX with expensive new antennas and equipment.

Starting from an existing installation similar to that shown in FIG. 1, in existing base stations the existing antenna 206 is mounted directly to a tilt bracket 106 and joint 108. The tilt bracket 106 and joint 108 are clamped to the antenna support 102 oriented with axis M vertical.

According to the invention, starting from this known base station, the antenna 206 is removed and fitted with the backplate 210 to form the antenna assembly 114. The antenna assembly 114 is then fitted to the first and second antenna mounts 110, 112 as described above.

The reference frame 104 of the assembly 100 is then fitted to the tilt bracket 106 and joint 108 with bolts having heads captured in the antenna support side of the reference frame (channels 152—see FIG. 6b).

Once mounted, the DGPS antenna 116 is then temporarily attached to the reference frame 104. It will be noted that the axis G of the DGPS antenna is parallel to the plane P of the intermediate member 104 (although this is not essential). As such, the plane P of the intermediate member 104 is aligned with the axis G.

The absolute orientation of the reference frame 104 is then determined to a high degree of accuracy using the D-GPS antenna 116. Once determined, the D-GPS antenna is removed (and reused) and the reference frame 104 is not moved thereafter. It will be noted that because the antenna is adjustable relative to the reference frame 104, there is no need to adjust the position of the reference frame 104 with the D-GPS unit installed. The technician needs only to determine the global position and orientation of the reference frame 104. This further reduces error.

It will be noted that the tilt of the antenna about a horizontal axis H4 shown in FIG. 8 can be achieved by articulating the first and second link members 126, 128 in the tilt bracket 106. This type of articulation is performed manually when the antenna is set up and is generally dependent on the height at which the antenna is mounted. This step is performed before the absolute position of the reference frame 104 is measured.

Figure 9A:
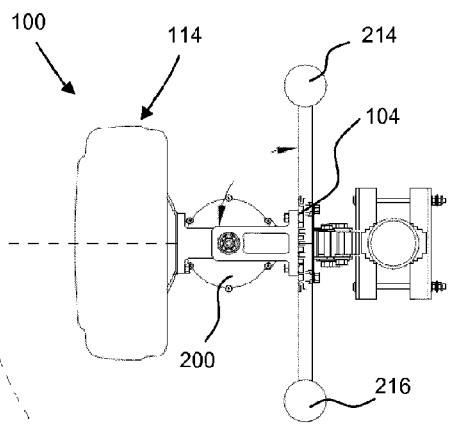
FIG. 9a is a plan view of the antenna mounting assembly of FIG. 2 in a first condition.
Figure 9B:
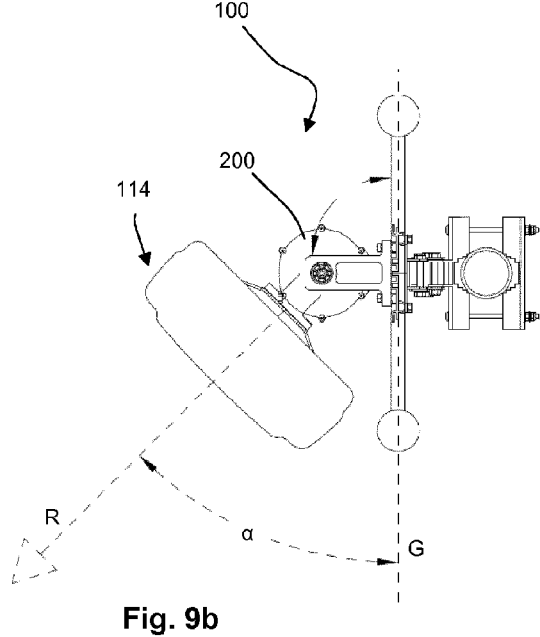
FIG. 9b is a plan view of the antenna mounting assembly of FIG. 2 in a second condition.
Figure 9C:
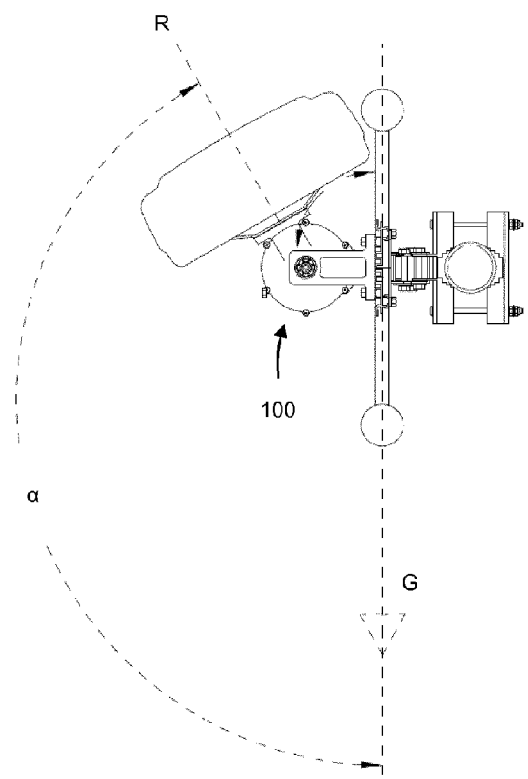
FIG. 9c is a view of the antenna mounting assembly of FIG. 2 in a third condition.

Turning to FIGS. 9a to 9c, the properties of the antenna mounting assembly 100 are shown in plan. Turning to FIG. 9a, the antenna assembly 114 is shown with the antenna having a primary radiation direction R perpendicular to the intermediate member 104 (which is aligned with the D-GPS axis G, shown for guidance only).

Because the system controller knows (i) the position and orientation in the global sense of the reference frame 104, and (ii) the orientation of the antenna assembly 114 relative to the intermediate member 104 by virtue of the rotary encoder provided within the steering and locking unit 200, the global orientation of the antenna 114 can be determined. The angle α between the axis G and the general direction of radiation R of the antenna 114 in FIG. 9*a* is 90 degrees. Turning to FIG. 9*b*, if the steering and locking unit 200 is used to rotate the antenna arrangement 114 by, for example, 45 degrees, it is known from the encoder that the angle α between G and R is now 45 degrees and this can be combined with the known absolute heading of the reference frame 104 to determine the absolute direction of radiation R. This is also true for FIG. 9*c* in which angle α is 135 degrees.

A joint 2194, an automated steering and locking assembly 2200, and a manual steering and locking assembly suitable for use with the antenna mounting assembly 100, are shown in FIGS. 10 to 13. The joint 2194 differs in minor constructional details to the joint 194, but its function is the same.

Figure 10:
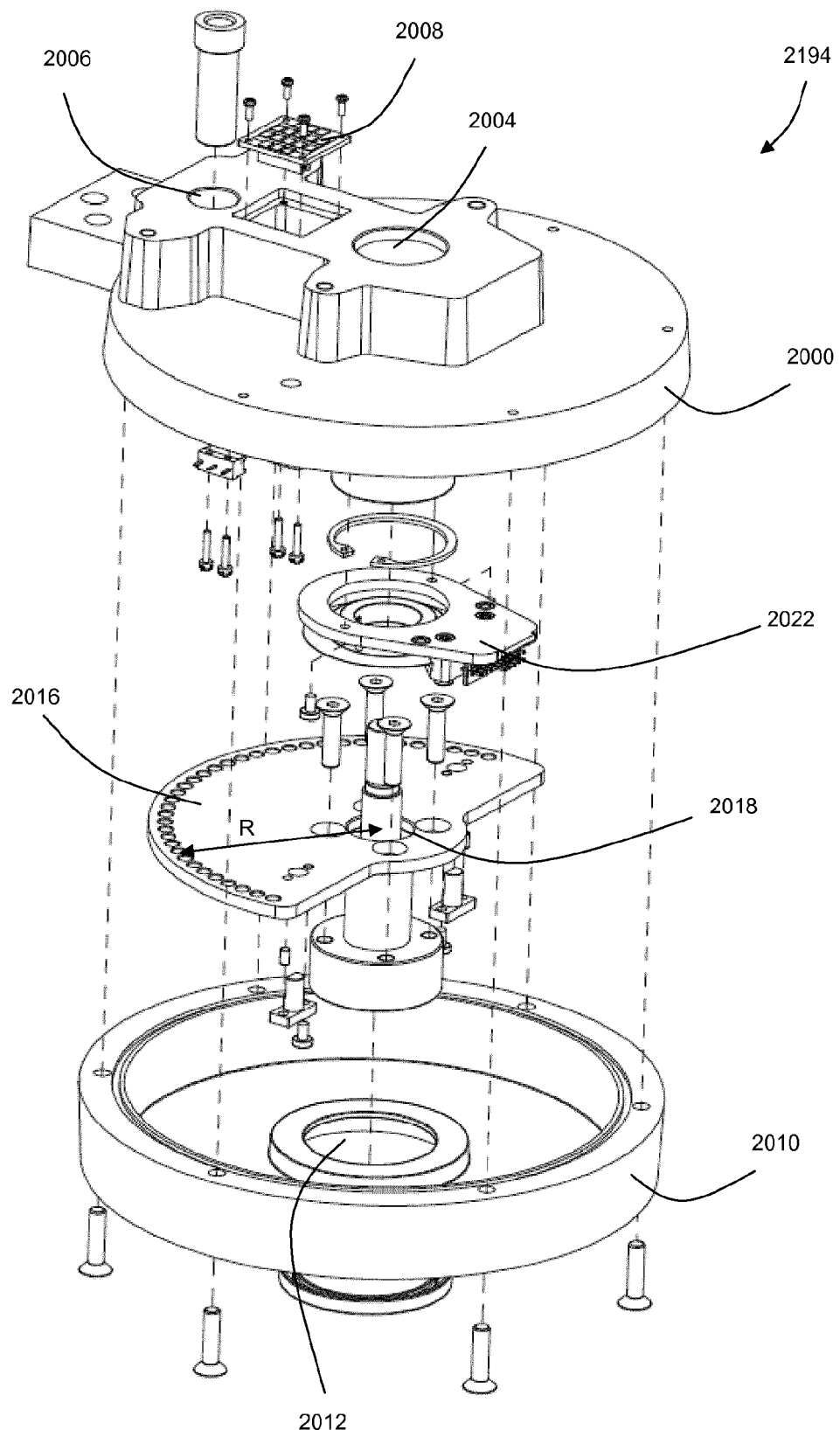
FIG. 10 is a detailed, exploded view of a part of a second antenna mounting assembly in accordance with the present invention.
Figure 11:
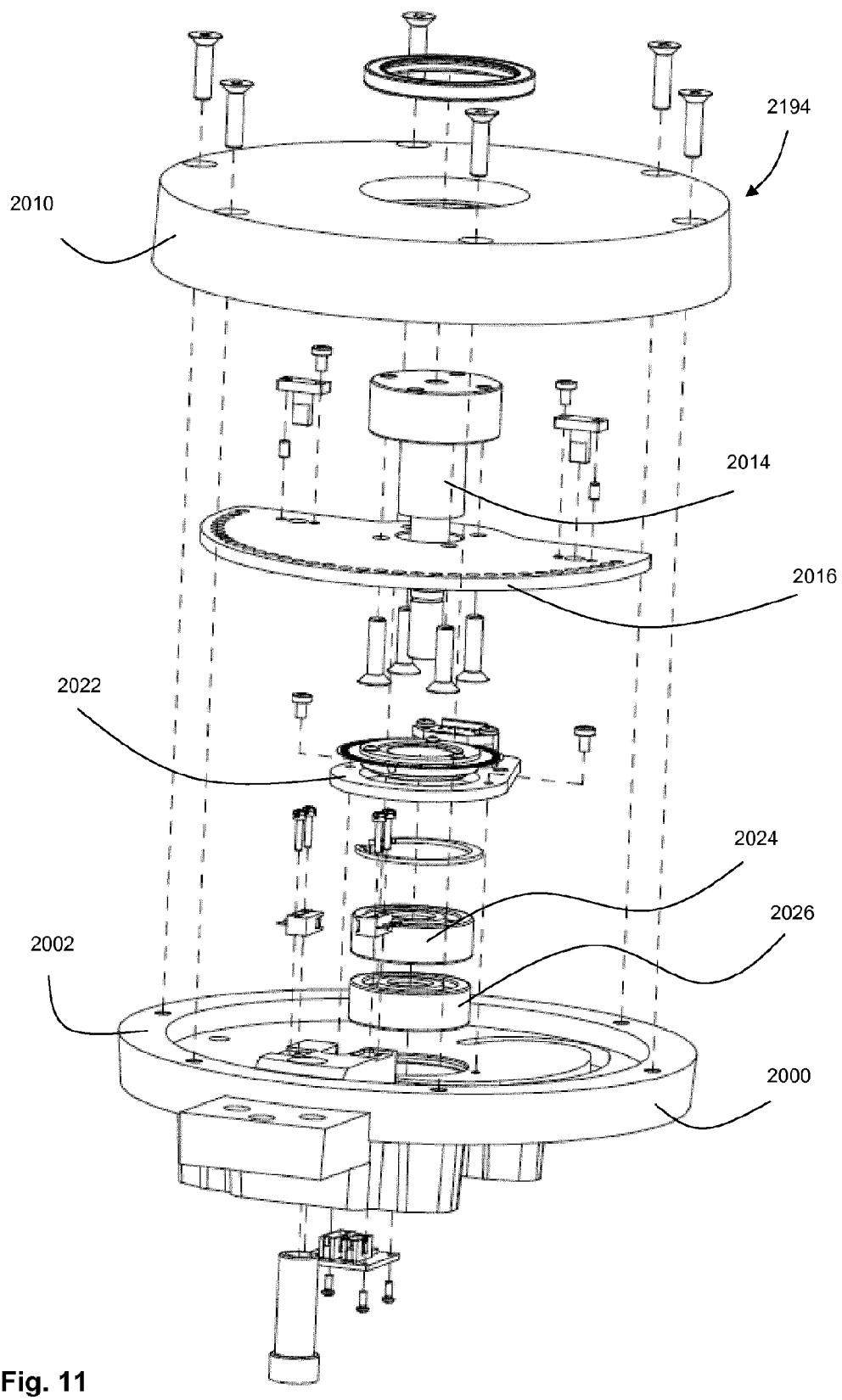
FIG. 11 is a further detailed, exploded view of the part of the antenna mounting assembly of FIG. 10.

Referring to FIGS. 10 and 11, the joint 2194 is shown. FIG. 10 shows the joint 2194 inverted. The joint 2194 comprises an interface plate 2000 which is generally circular and has an upstanding rim 2002 at its periphery. The plate 2000 defines an input drive bore 2004, a stop pin bore 2006 and a data connector 2008 in its lower surface.

Opposite the interface plate 2000, and engageable therewith there is provided a cover plate 2010 which is configured to assemble to the interface plate 2000 and form an IP67 level (International Protection Rating) seal therewith around an inner volume.

The cover plate 2010 defines an output drive bore 2012 in its centre, concentric with the input drive bore 2004 of the interface plate 2000.

Within the joint 2194 there is provided a drive shaft 2014 one end of which is accessible from the drive bore 2012 of the cover plate for attachment of e.g. the second member 196 of the assembly 100. The other (lower) end of the drive shaft 2014 is accessible from the input drive bore 2004.

A locking plate 2016 is provided. The locking plate 2016 is a 180 degree circle segment having a geometric centre bore 2018 and a series of locking bores 2020 positioned at a set radius R from the centre bore 2018 and spanning 180 degrees. The locking plate is attached to the drive shaft 2014 at the centre bore 2018 such that it can rotate therewith about the joint axis J2.

An optical encoder 2022 is provided to receive the drive shaft 2014 and measure relative rotation thereof. The optical encoder 2022 is attached to the interface plate 2000, but receives the drive shaft to measure its rotation. The optical encoder 2022 is connected to provide an output signal to the connector 2008 to deliver data representative of the degree of rotation of the shaft 2014 relative to the housing defined by the interface plate 2000 and the cover plate 2010.

The joint 2194 also comprises tilt and roll sensors (which are relatively inexpensive), and data regarding the tilt and roll angles of the reference frame (to which the joint 2194 is attached) are also fed to the connector 2008. Therefore the connector 2008 is a source of tilt, roll and relative heading data.

A pair of adjacent bearings 2024, 2026 are provided to receive the drive shaft 2014 and support it in use.

Figure 12:
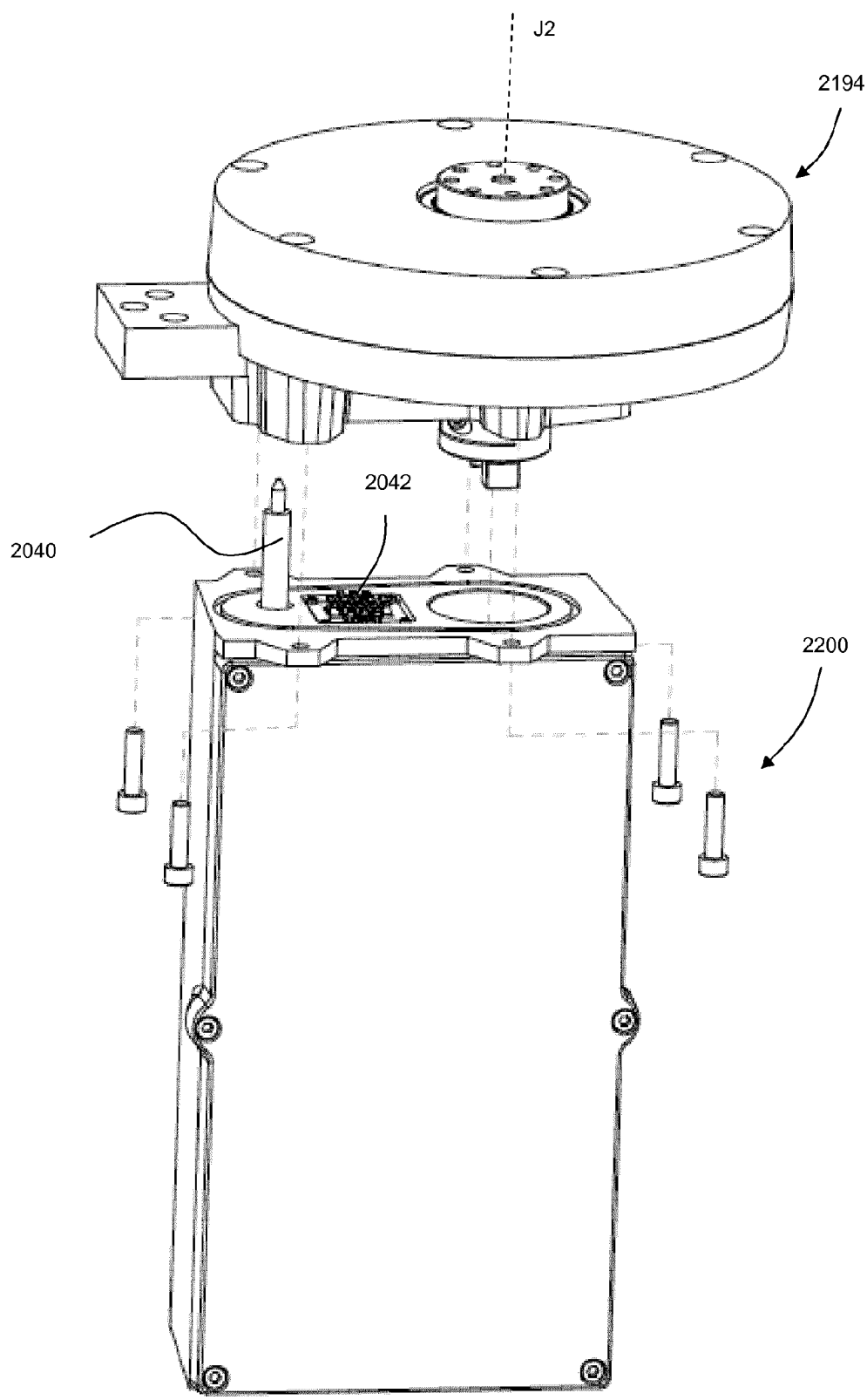
FIG. 12 is a detailed, exploded view of the part of the antenna mounting assembly of FIG. 10 with automated steering and locking.
Figure 13:
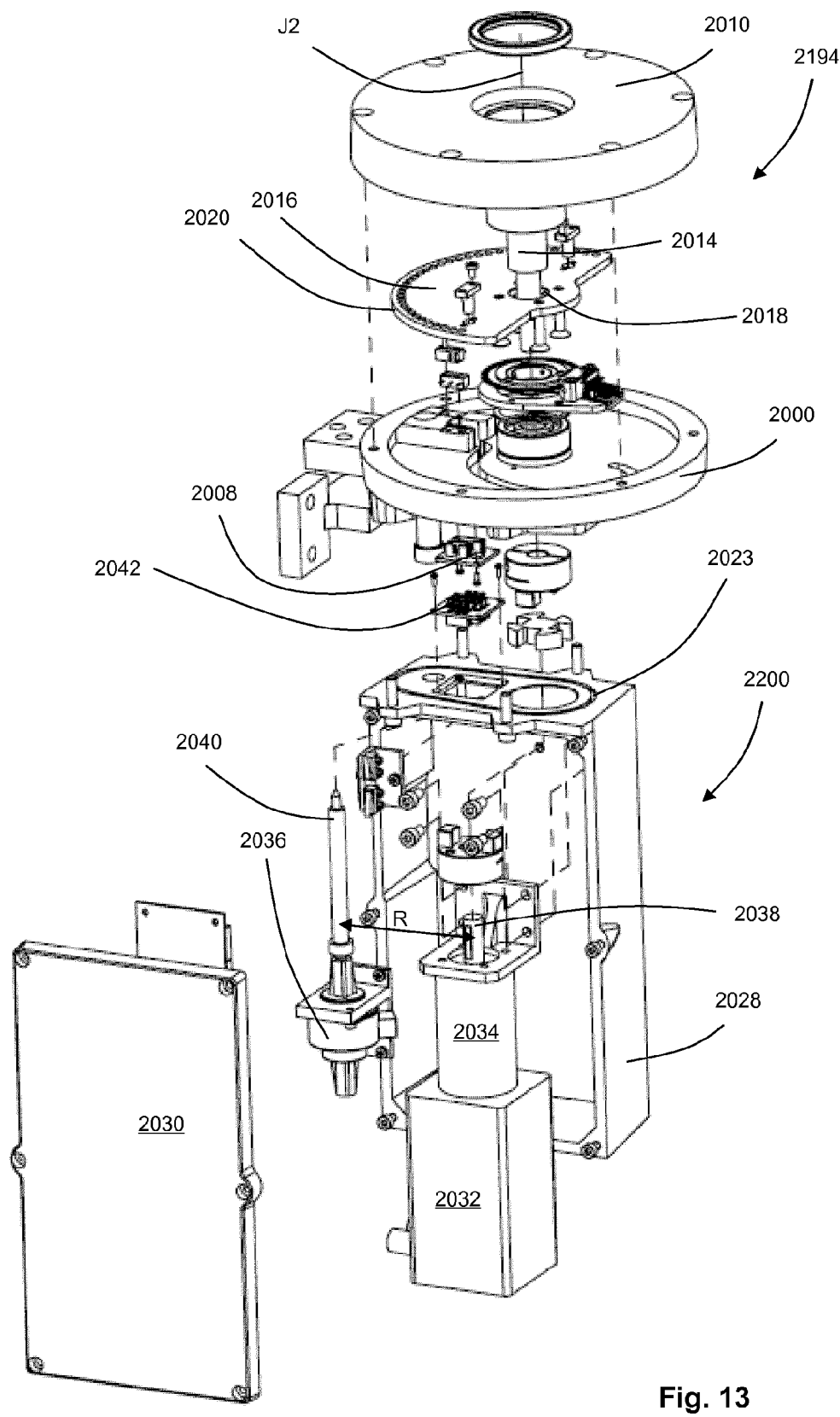
FIG. 13 is a further detailed, exploded view of the part of the antenna mounting assembly of FIG. 10 with automated steering and locking.

Turning to FIGS. 12 and 13, a steering and locking assembly 2200 similar to the steering and locking assembly 200 is shown in detail, assembled with the joint 2194.

The steering and locking assembly 2200 comprises a housing 2028 having a cover 2030, which housing is IP67 sealed. The assembly 200 contains an electric motor 2032, a step down gearbox 2034 and a separate stop pin actuator 2036 comprising a solenoid. The gearbox has an output shaft 2038 which can be driven in rotation by the motor 2032, and the stop pin actuator is connected to a linearly actuable stop pin 2040 at a distance R to the shaft 2038. Both the shaft 2038 and the stop pin 2040 project from the housing 2028.

An electrical connector 2042 is provided between the shaft 2038 and the stop pin 2040 on the outside of the housing 2028.

The interface plate 2000 of the joint 2194 acts as a plug and play interface for either an automated (FIGS. 12 to 13) or manual (FIG. 14) actuation system. The interface plate presents a steering input, a locking input and a data output from the encoder.

As shown in FIG. 12, the steering and locking assembly 2200 can be assembled to the interface plate 2000 so that the output shaft 2038 can drive the drive shaft 2014, and the stop pin 2040 can selectively engage the locking bores 2020 on the locking plate 2016. The electrical connector 2042 interfaces with the connector 2008 on the interface plate to retrieve data from the optical encoder 2022. The steering and locking assembly 2200 and the interface plate 2000 are IP67 sealed by means of seal 2023 which surrounds the three interfaces.

The assembly of the joint 2194 and steering and locking assembly 200 therefore provides an accurate relative positioning system, in which the drive shaft 2014 (and therefore the second member 196) can be steered (resulting in azimuth adjustment of the antenna) whilst accurately measuring relative rotational position and providing locking when in the desired position, to eliminate any error or movement from motor or gearbox backlash.

It will be noted that the optical encoder 2022 takes a reading directly from the shaft 2014—i.e. directly from the antenna. In other words the encoder is on the antenna side of the gearbox 2034. The connection between the antenna and the encoder 2022 is therefore direct and ungeared. Advantageously this means that the encoder measures the true position of the antenna without any problematic error or backlash which can be introduced if the encoder was positioned e.g. on the opposite side of the gearbox 2034 to the antenna. Therefore this system offers an advantage over e.g. systems using a position sensor integral with the motor 2032.

The data provided by the connector 2008 (specifically tilt, roll and relative heading compared to the reference frame) can be used to calculate the global orientation of the antenna using the absolute position of the reference frame determined during set up. This global orientation can be used to steer the antenna to the desired position as demanded by the network operator. We refer to the applicant's earlier application WO2013/011002 for details on this alignment method.

Figure 14:
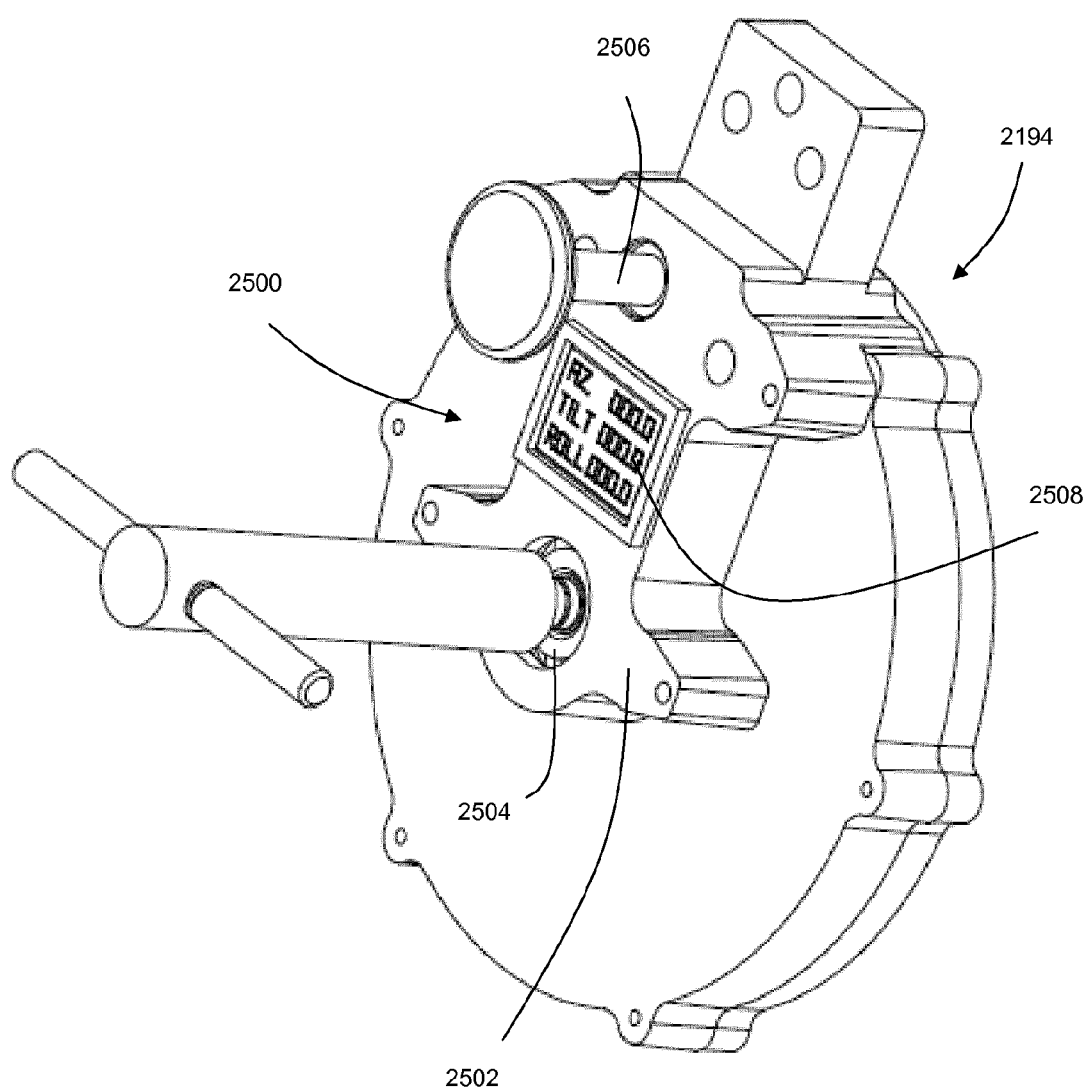
FIG. 14 is a detailed view of the part of the antenna mounting assembly of FIG. 10 with manual steering and locking.

Instead of the automated steering and locking assembly 2200, an alternative manual steering and locking assembly 2500 is shown in FIG. 14, assembled with the joint 2194.

The manual assembly 2500 comprises a casing 2502 having a through bore for a steering shaft 2504 and a resilient locking pin 2506 associated therewith. The assembly 2500 also comprises an electrical data connector (not visible) arranged to connect to the electrical connector 2008 to receive position data from the optical encoder 2022 and display it on a display panel 2508.

In use, the assembly 2500 is attached to the interface plate 2000 as shown in FIG. 14 such that a manual tool 2510 (e.g. a T-bar) can be inserted into the through bore for a steering shaft 2504 to access the drive shaft 2014 and thereby steer the antenna.

During such rotation, the locking pin 2506 must be pulled to disengage a projecting pin (similar to the pin 2040) from the locking plate 2016. Once released, the pin 2506 resiles under the action of a spring (not shown) towards the plate 2016 and will engage with the relevant bore 2020 to lock the drive shaft 2014 in place.

During rotation of the tool 2510 (an hence the antenna) the display panel 2508 will accurately read the position of the antenna based on the known absolute position of the reference frame 104 (determined and electronically stored during setup) and the relative rotation of the antenna with respect to the reference frame as determined by the optical encoder 2022.

The manual and automated systems can be freely interchanged—for example an antenna installation may be initially provided with the manual system, and later upgraded to the automated system when more frequent adjustment is required.

Turning to FIGS. 15a to 20b, there is provided a simpler antenna mounting apparatus 3010. The apparatus comprises an upper mount assembly 3012, a lower mount assembly 3014 and a stability bar 3016 extending therebetween. As shown in FIG. 15b, an antenna 3018 can be attached to both the upper and lower mount assemblies 3012, 3014 (as will be described below) in order to position it for use in a cellular communications network.

Figure 16A:
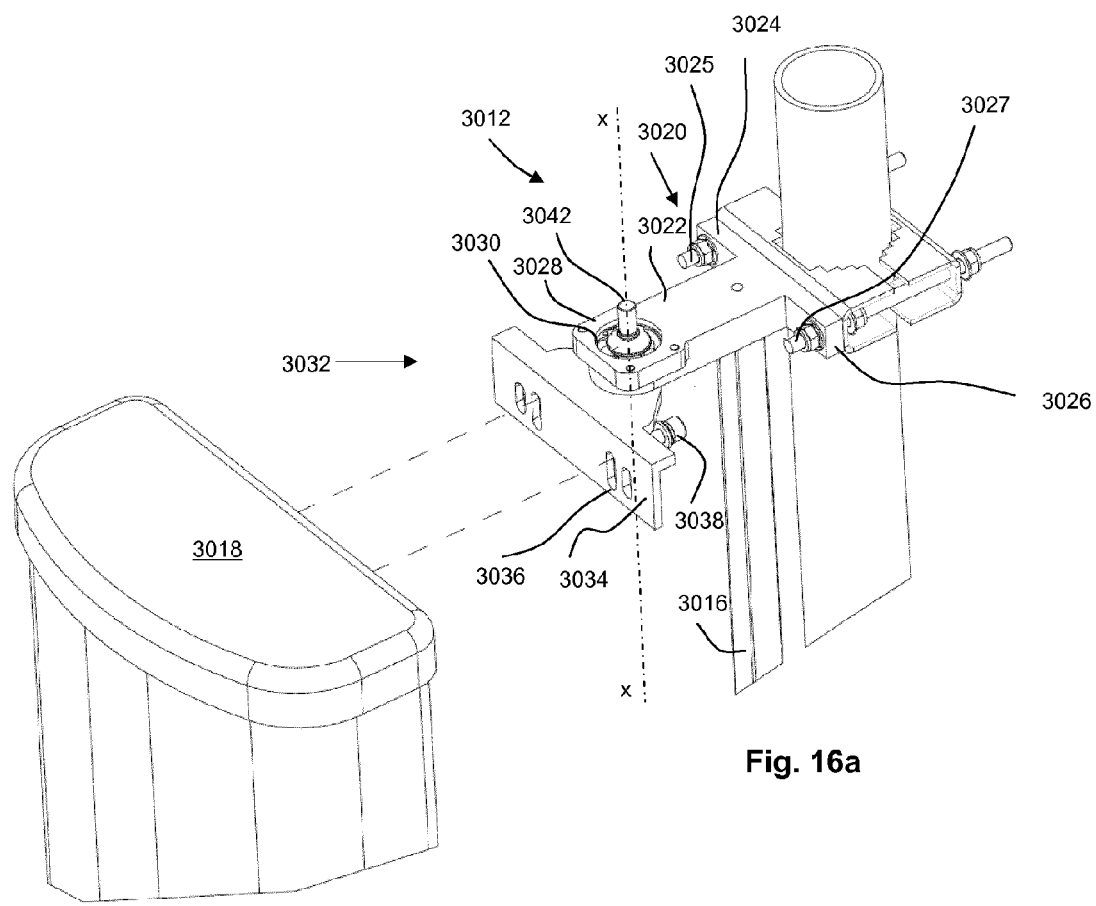

Turning to FIG. 16a, the upper mount assembly 3012 is shown in more detail. The upper mount assembly 3012 comprises a mount 3020 and an antenna bracket 3032.

The mount 3020 has a flat rectangular body 3022. At a first end of the body 3022 oppositely extending attachment flanges 3024, 3026 are provided such that the mount 3020 is "T" shaped in plan view. Each of the flanges 3024, 3026 defines an open horizontal bore through the vertical faces thereof for attachment to a mounting arrangement via mechanical fasteners 3025, 3027. Each of the through bores is oriented in a direction parallel to a main axis of the body 3022. The body 3022 also defines a square blind bore (not shown) on its underside proximate the flanges 3024, 3026. At the opposite end of the body 3022 to the flanges 3024, 3026, a bearing mount region 3028 is provided which defines a vertically oriented joint receiving formation 3030.

The antenna bracket 3032 is generally shaped as an inverted "L" in cross-section. The bracket 3032 comprises a vertical antenna attachment flange 34 forming the vertical leg of the inverted "L" defining several slots 3036 for the passage of mechanical fasteners 3038 to attach the antenna 3018 to the flange 3032. A bearing mount flange 3040 is provided extending horizontally from the upper edge of the antenna attachment flange 3034 to form the horizontal leg of the inverted "L". The bearing mount flange 3040 is generally semicircular in shape. The bearing mount flange 3040 also defines a vertically oriented joint receiving formation (not visible).

To assemble the upper mount assembly 3012, a rotational joint 3042 comprising a bearing is simultaneously installed in the joint receiving formation 3030 of the bearing mount region 3028 and the joint receiving formation of the bearing mount flange. The rotational joint bearing is of known type, and as such will not be described in detail here. It provides a rotational degree of freedom for rotation of the bracket 3032 relative to the mount 3020 about an azimuth steering axis X.

Figure 16B:
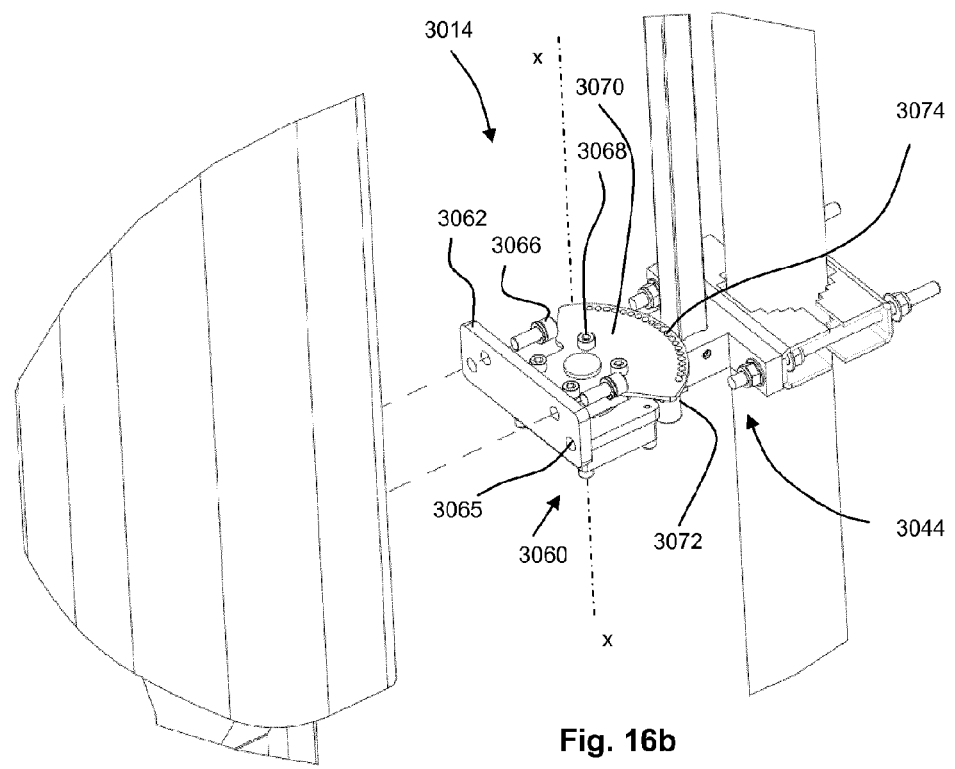
Figure 16C:
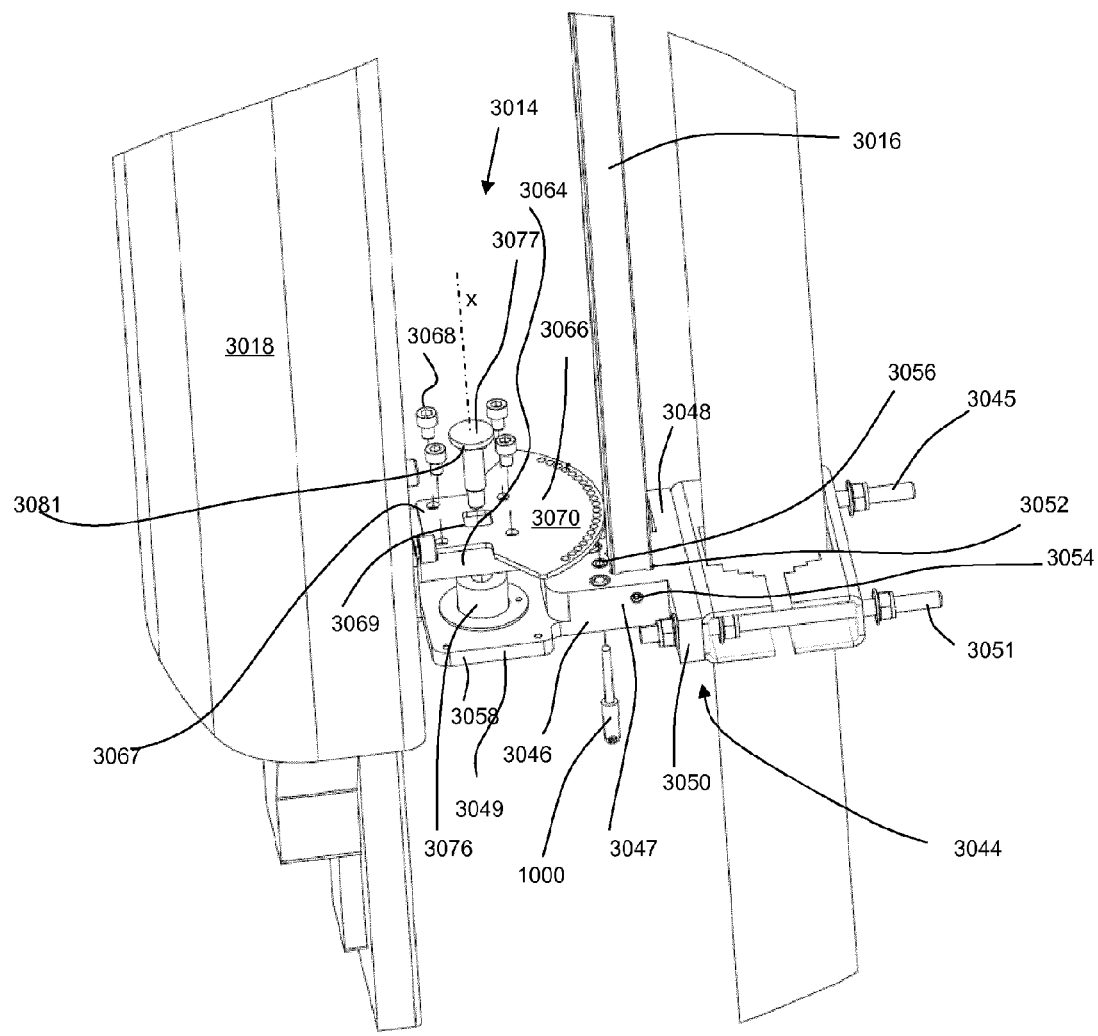
FIG. 16c is an exploded view similar to FIG. 16b.

The lower mount assembly 3014 is shown in more detail in FIG. 16b (with the antenna 3018 detached) and 16c (with the antenna 3018 attached). Like the upper mount assembly 3012, the lower mount assembly 3014 comprises a mount 3044 and an antenna bracket 3060.

The mount 3044 comprises a stepped body 3046 having a first region 3047 stepping down in thickness to a second region 3049. At the end of the first region 3047 opposite the second region 3049 there are provided two flanges 3048, 3050 extending oppositely to form a T-shape in plan view. The flanges 3048, 3050 comprise horizontal through bores for the attachment of mechanical fasteners 3045, 3051 for mounting the assembly to an appropriate mounting arrangement.

The first region 3047 of the stepped body 3046 defines a blind rectangular bore 3052 on it upper surface. A threaded grub screw hole 3054 extends from an accessible outer side of the stepped body 46 and is in communication with the rectangular bore 3052.

A vertical pin receiving through bore 3056 is provided in the first region 3047 of the stepped body 3046 proximate the rectangular bore 3052. The pin receiving bore is provided as close as possible to, but on the second region 3049 side of, the rectangular bore 3052.

The second region 3049 comprises a bearing plate 3058. The bearing plate 3058 defines a vertically oriented joint receiving formation (not visible).

The antenna bracket 3060 comprises a vertical attachment flange 3062, a bearing support 3064 and a locking plate 3066.

The attachment flange 3062 defines a number of bores 3065, suitable for receiving mechanical fasteners 3066 in order to secure the antenna 3018 thereto. The bearing support 3064 extends horizontally (i.e. perpendicularly) from the flange 3062 and comprises a pair of offset plates.

Figure 17:
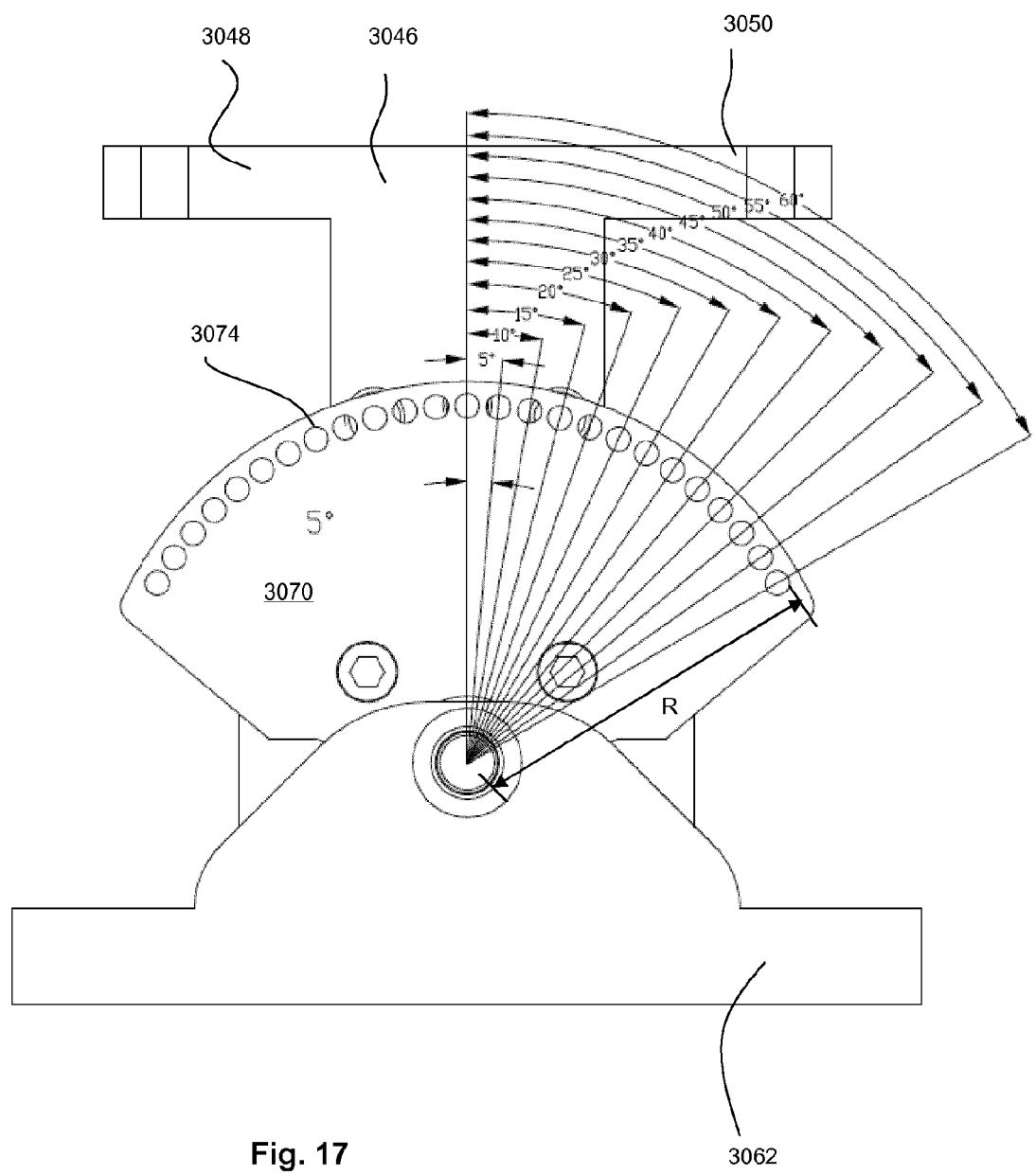

The locking plate 3066 comprises a bearing plate 3067 and a fan plate 3070 integral therewith. The bearing plate 3067 is generally square and defines a central square through bore 3069. The fan plate 3070 extends from the bearing plate 3067 an describes a 130 degree circle segment, with its centre of curvature at the centre of the through bore 3069. The fan plate 3070 has an outer edge 3072 describing a 130 degree circle segment, proximate which an arcuate row of pin receiving through bores 3074 are provided at a common radius. Turning to FIG. 17, further geometric detail of the locking plate 3070 is shown. As will be seen, each of the bores 3074 are positioned at a common radius R and 5 degrees apart ranging from −60 to +60 degrees. Therefore, the total range of azimuth steering is 120 degrees.

The flange 3062 and the bearing support 3064 are integral. The locking plate 3066 is attached to the bearing support 3064 by means of mechanical fasteners 3068. The flange 3062, bearing support 3064 and locking plate 3066 are all perpendicular.

A rotational joint 3076 comprising a roller bearing is provided and disposed to permit rotation between the antenna mounting bracket 3060 and the mount 3044 about the azimuth steering axis X. The rotational bearing assembly 3076 is mounted to the bearing plate 3058 in the joint receiving formation such that it projects upwards between the vertical plates of the bearing support 3064 (see FIG. 16c).

A pivot pin 3077 is provided, having a shaft 3079 with a square profile 3081 near its head. The pivot pin 3077 is fed through the square through bore 3069 and rotatably engages the bearing assembly 3076. The pivot pin 3077 also projects to the other (lower) side of the joint 3076 and the bearing plate 3058 (see FIG. 19a). The mating between the square profile 3081 and through bore 3069 locks the antenna bracket 3060 and pin 3077 together such that whilst both can rotate via the joint 3076 relative to the mount 3044.

The projection of the pivot pin allows for easy retrofit of the an actuator should the operator want to move to an automated system.

It will be noted that the distance from (i) the centre of rotation of the joint receiving formation in the bearing plate 3058 and (ii) the pin receiving bore 3056 is the same as the distance from (iii) the centre of the square through bore 3069 to (iv) each of the plurality of bores 74. Therefore as the joint 76 is rotated about the axis 'X', then the pin receiving bore 3056 will sequentially align with each of the plurality of bores 3074.

It will also be noted that the locking plate 3060 rests on the body 3046 of the mount 3066 and slides over it.

The stability bar 3016 is generally square in cross-section and is configured to fit into the square bore on the underside of the mount 3020 as well as the square bore on the top side of the mount 3060. As well as maintaining the distance between the mounts, the bar also resists any torsional forces generated therebetween by movement of the antenna by actuation, or e.g. wind loading. The stability bar 3016 is secured in position with the use of radial grub screws (see bore 3054). It will be noted that the stability bar is replaceable to allow different sizes of antenna to be accommodated in the apparatus 3010.

The invention may be provided in a manual, or a remotely actuated version.

Figure 18A:
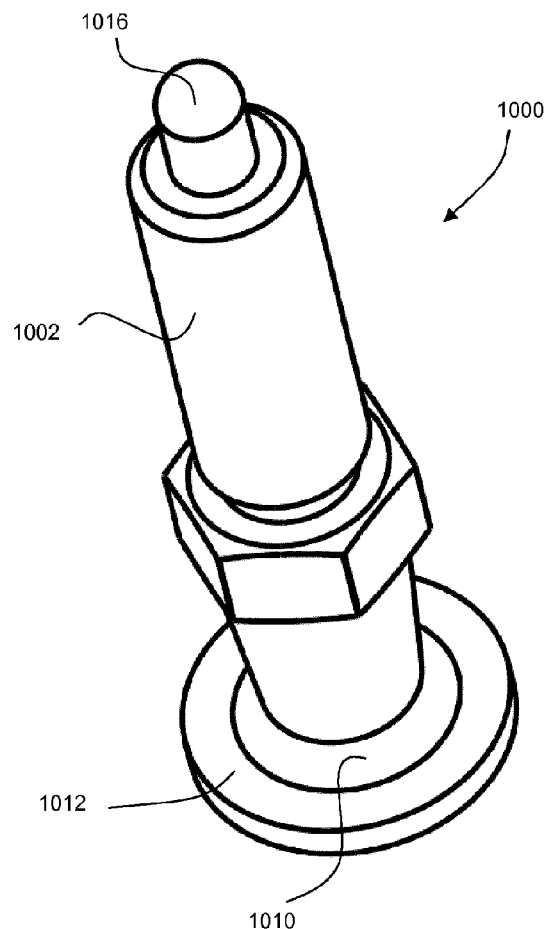
Figure 18B:
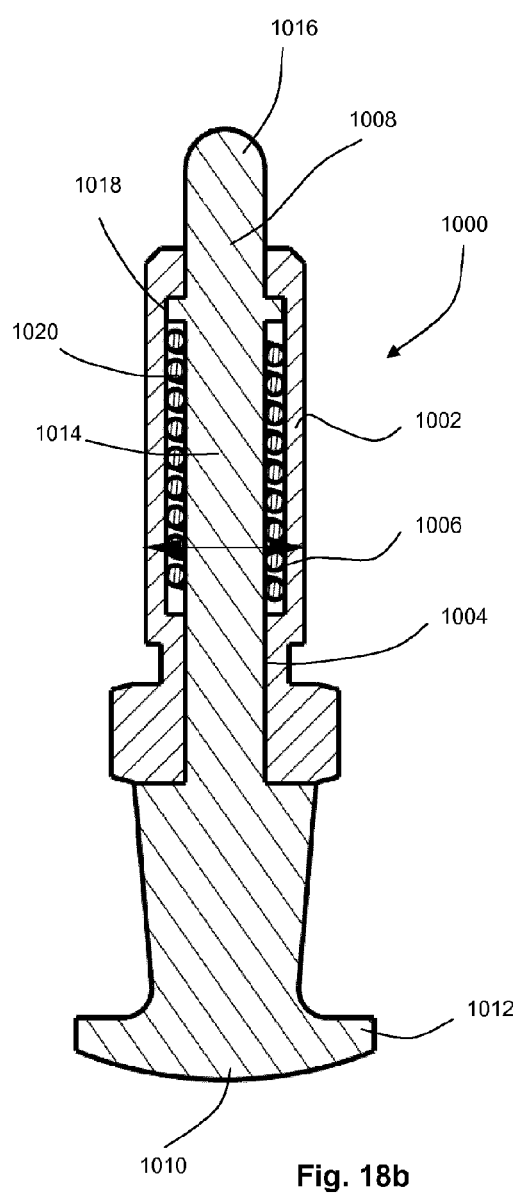

In the manual configuration of the present invention, a retractable pin assembly 1000 is provided, as shown in detail in FIGS. 18a and 18b. The pin assembly 1000 comprises a hollow shaft 1002 having a through bore 1004 and an annular channel 1006 defined in an inner sidewall thereof. A pin member 1008 is provided having a head 1010 with a flange 1012. The head 1010 extends into a shaft 1014 having a free end 1016. The shaft 1014 comprises an annular flange 1018 which slides within the annular channel 1016. A compression spring 1020 is positioned within the channel 1006 and may be compressed by the flange 1018 such that the shaft 1014 resiles to an extended position from the shaft 1014.

In use, an operator can access the antenna, pull the head 1010 by the flange 1012 to retract the pin member 1008 and rotate the antenna as required. When the pin member 1008 is released the spring will urge the pin member 1008 into the extended position shown in FIG. 18b and lock the antenna in position. It will be noted that if the relevant bores are not properly aligned, a small movement of the antenna in either direction (e.g. under wind loading) will result in alignment and the pin member will always "snap" into position, inhibiting further movement of the antenna. Therefore the system has a failsafe condition should the operator forget to ensure that the locking mechanism has engaged.

Figure 19A:
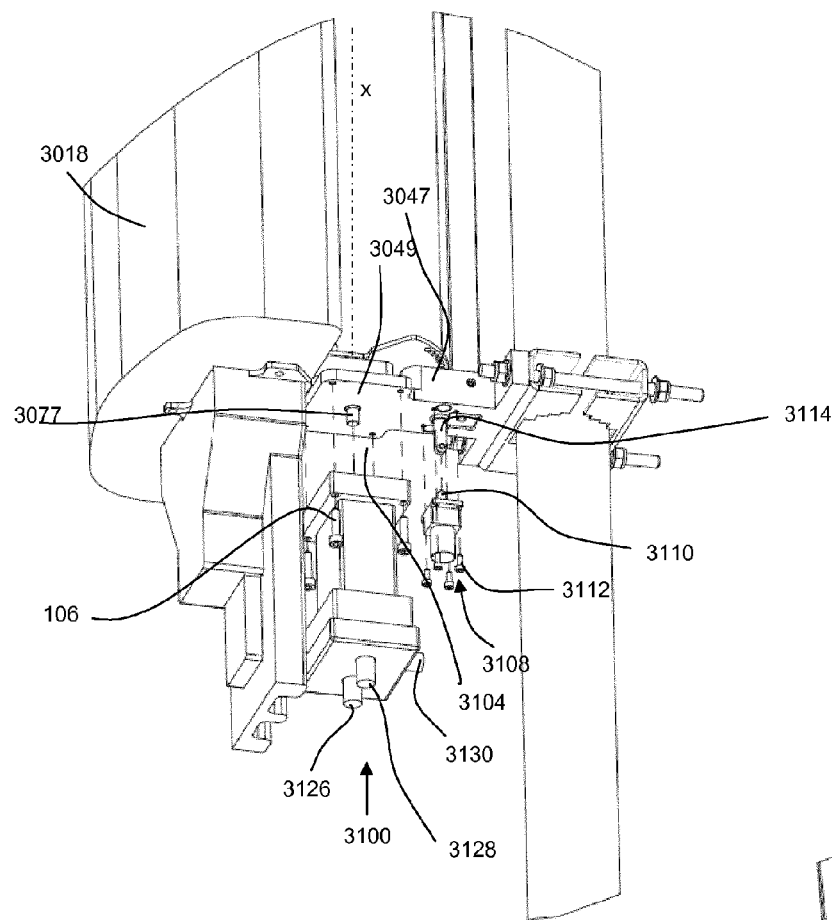
FIG. 19a is a detail, perspective underside view of the part of the first antenna mounting apparatus in an alternative, automated configuration.
Figure 19B:
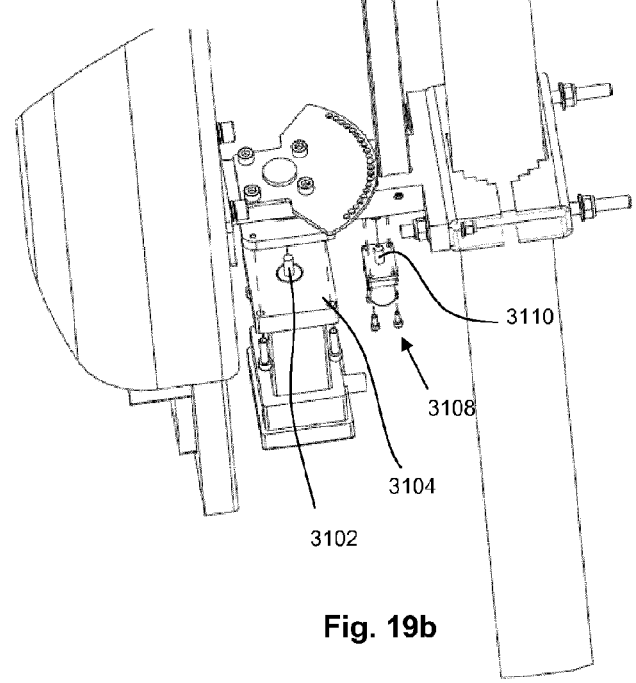
Figure 19C:
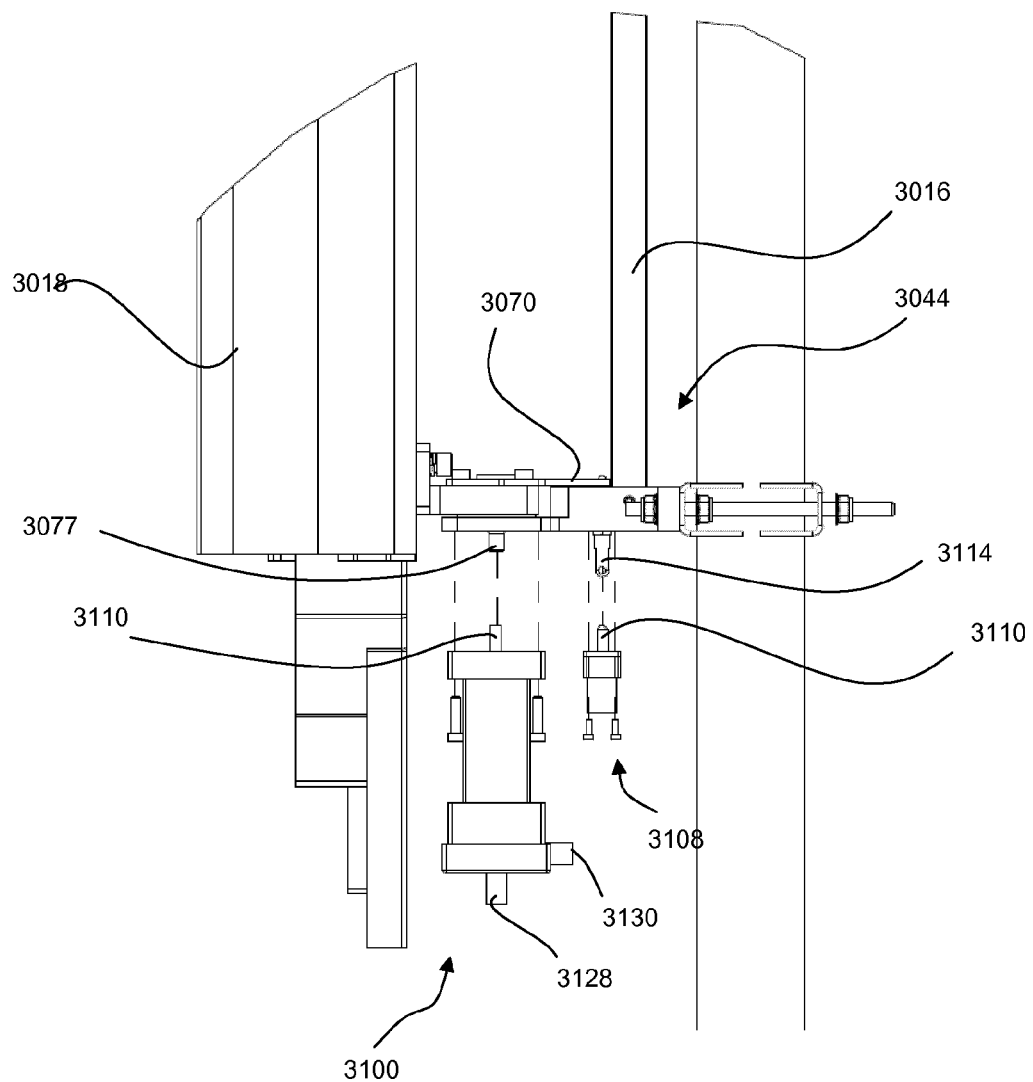
FIG. 19c is a detail, side view of the part of the antenna mounting apparatus shown in FIGS. 19a and 19b.

Turning to FIGS. 19a to 19c, a remotely actuated version of the present invention is shown. A drive assembly 3100 (described in more detail below) is provided having an output shaft 3102 projecting from an attachment plate 3104. As shown in FIG. 19a, the attachment plate 3104 is secured to the underside of the second region 3049 of the stepped body 3046 of the bearing plate 3058. Fasteners 3106 are provided for this purpose.

As described above, the pin 3077 projects below the bearing plate 3058 and is engageable by the output shaft 3102 to drive it in rotation. Known rotary couplings may be used for this purpose, such as a splined coupling, or shaft with a flat. It will be noted that once the drive assembly 3100 has been attached, actuation thereof will drive the pin 3077 which, by virtue of its engagement with the locking plate 3066 as hereinbefore described, with act to rotate the antenna 3018 about the azimuth rotation axis X. The upper mount assembly 3012 is free in rotation.

Figure 20A:
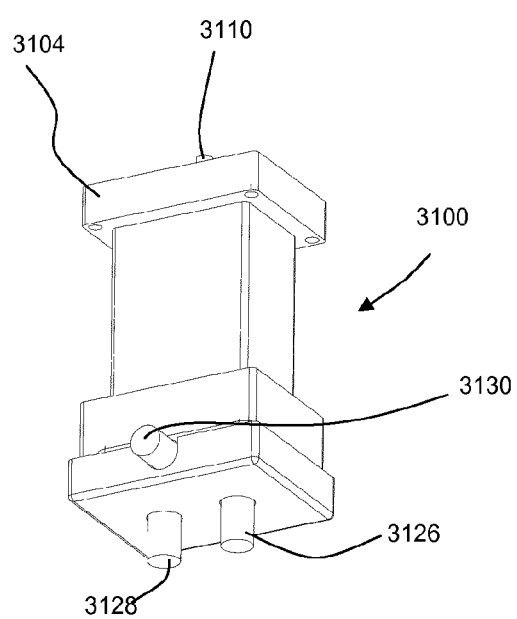
FIG. 20a is a perspective view of a part of the antenna mounting apparatus shown in FIGS. 16a to 16c.
Figure 20B:
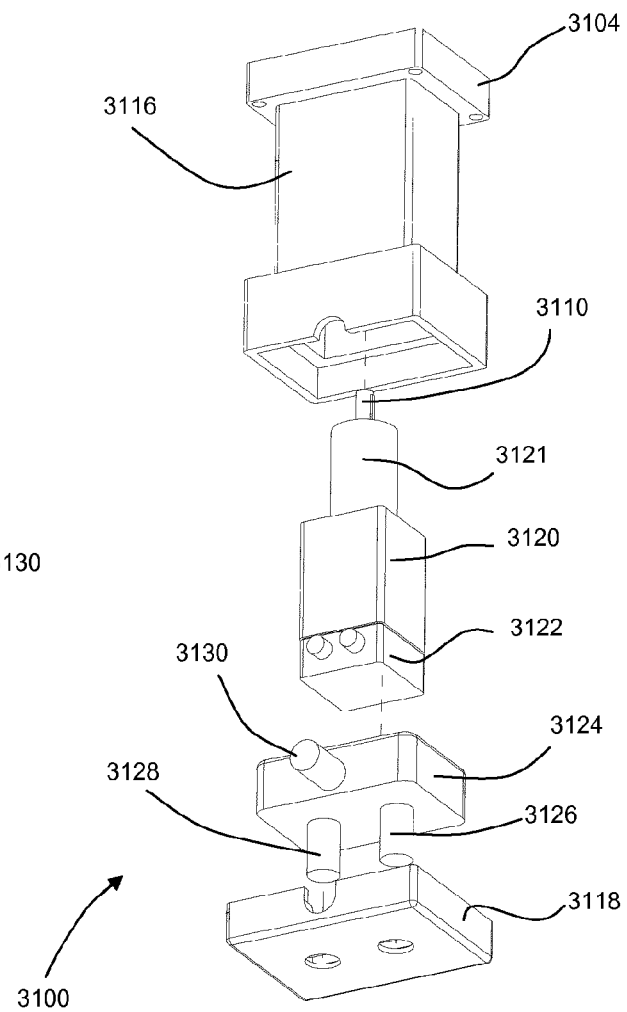

The drive assembly 3100 is shown in more detail in FIGS. 20a and 20b. The drive assembly 3100 comprises a housing 3116 defining the attachment plate 3104 on a top surface thereof. The housing 3116 has a removable base 3118.

An electric motor 3120 is provided comprising a gearbox 3121 which drives the output shaft 3102. The shaft 3102 projects from the attachment plate 3104 when the motor is installed in the housing 3116. The electric motor 3120 further comprises an encoder 3122 which measures the rotation of the motor 3120, and therefore the rotation of the geared output shaft 3102 can be calculated. A local control unit 3124 is provided, which as well as controlling the motor 3120, can step the motor by desired increments from an input demand via a connector 3126. The local control unit 3124 receives a request from a remote control station, e.g. to move to +30 degrees azimuth, and activates the motor 3120 to move the antenna 3018. When the encoder 3122 reports that the motor has moved by the desired amount (taking account of the gearing), the local control unit stops the motor 3120. Feedback can be provided to the remote control station via a connector 3128.

The local control unit 3124 further comprises a stop output connector 3130.

Turning back to FIGS. 19a and 19b, a stop assembly 3108 is also provided. The stop assembly 3108 comprises a linear output pin 3110, which can be moved in an axial sense. The assembly 3108 is fastened to the underside of the first region 3047, as shown in FIG. 19a by mechanical fasteners 3112. The linear actuator 3110 is engageable with a stop pin 3114, which can be driven in a vertical manner from a retracted position in which engages only with pin receiving bore 3056 to an extended position in which it engages with both the pin receiving bore 3056 and the one of the plurality of bores 3074 with which it is aligned.

When the antenna is static, the linear output pin is extended, such that the stop pin 3114 engages and locks the mount 3044 to the antenna bracket 3060, effectively preventing the joint 3076 from articulating.

When the local control unit 3124 receives a signal to move the antenna 3018, it commands the stop assembly 3108 to retract the pin 3110 and therefore the pin 3114 to the retracted position. The bracket 3060 can then rotate relative to the mount 3044. The local control unit 3124 then actuates the antenna using the motor 3120 as described above until the encoder report the desired position has been reached. Once the desired position has been reached, the stop assembly 3108 is commanded to push the pin 3114 into the extended position, thereby locking the antenna in place. The local control unit is configured to only step by multiples of 5 degree segments. It will be noted that whilst the pin 3114 is actuated, the motor 3120 holds the antenna in place, to prevent any misalignment from external loading (e.g. wind). Only when the pin 3114 is engaged does the motor 3120 become inactive.

Because the locking plate 3070 is in contact with the mount 3044, the pin 3114 is placed in shear loading only, and not in bending (as would occur with a gap therebetween). This makes the pin 3114 structurally more effective.

Any subsequent wind loading can be resisted by the pin 3114, rather than the more delicate and expensive drive assembly 3100. The drive assembly 3100 to be designed only to be able to drive the antenna in rotation whilst the majority of the reaction load caused by back driving (such as wind) can be resisted by the lock 3108.

Figure 21A:
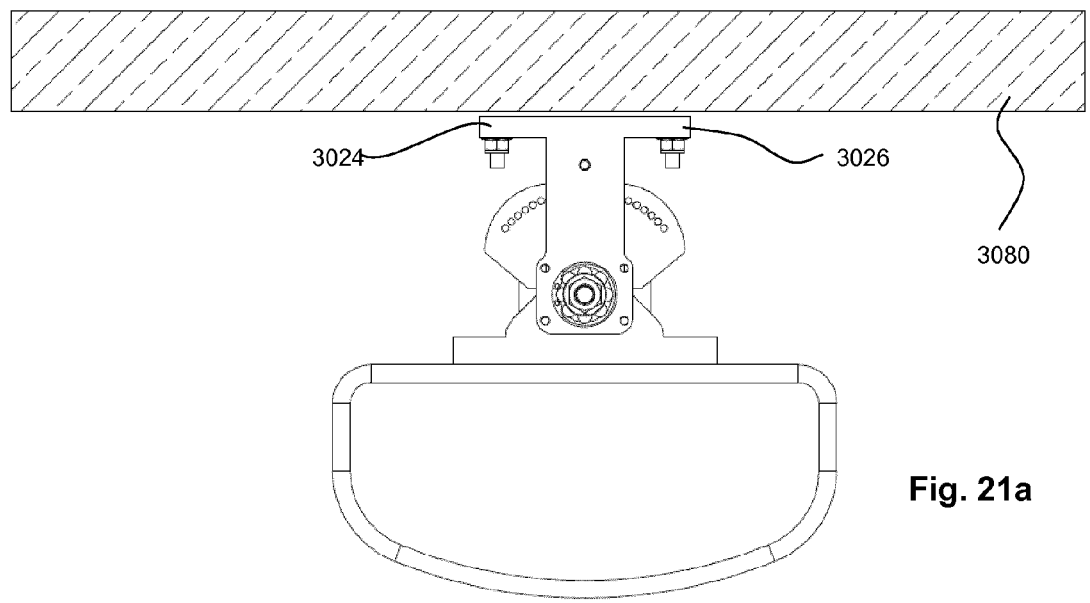
Figure 21B:
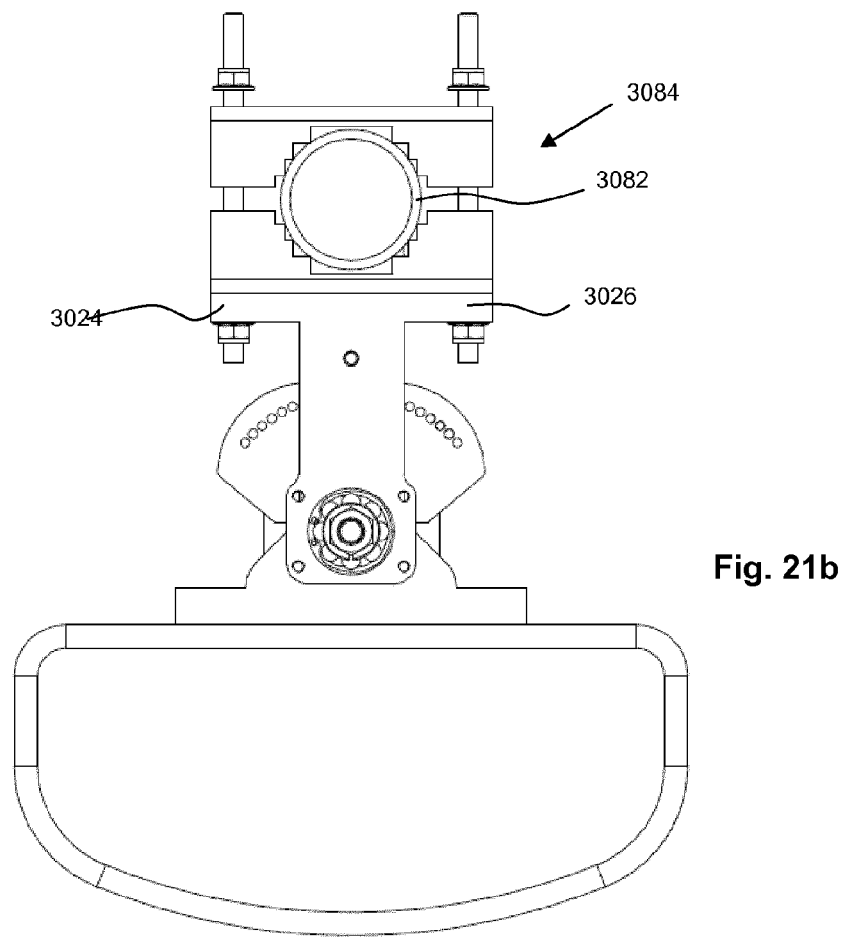

Turning to FIGS. 21a and 21b, various mounting arrangements are shown. For example, in FIG. 21a, the bores in the flanges 3024, 3026 have been used to attach the antenna mounting bracket to a wall 3080. Turning to FIG. 21b, the same bores 3024, 3026 have been used to attach the antenna mounting apparatus to a pole 3082 using a clamp 3084.

Turning to FIGS. 22a to 25, a further embodiment of the present invention is shown. Like reference numerals numbered 200 greater will be used for components which are similar to those in the mounting apparatus 3010.

A mounting apparatus 3210 is shown in FIGS. 22a to 25. Like mounting apparatus 3010, mounting apparatus 3210 comprises an upper mount assembly 3212, a lower mount assembly 3214 and a stability bar 3216, extending therebetween. An antenna 3218 can be positioned on both the upper and lower mount assemblies 3212, 3214 to be actuated and steered in an azimuth direction.

Figure 23A:
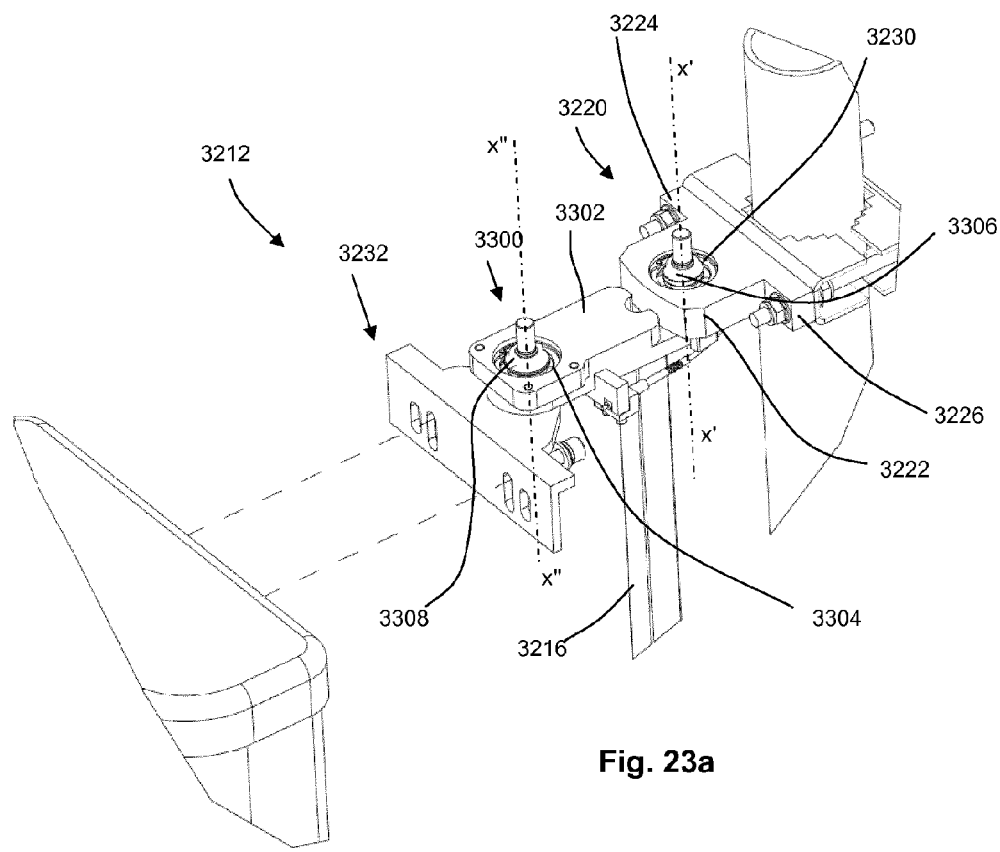

Turning to FIG. 23a, the upper mount assembly 3212 is shown in more detail. The upper mount assembly 3212 comprises a mount 3220, an intermediate member 3300 and an antenna bracket 3232.

The mount 3220 is somewhat similar to the mount 3020 of the apparatus 3010, however, the flat rectangular body 3222 of the mount 3220 is shorter. Flanges 3224, 3226 are still provided, as is a vertically oriented joint receiving formation 3230.

An intermediate member 3300 is provided which comprises an elongate, flat body 3302, having a first joint receiving formation (not shown) at a first end, and a second joint receiving formation 3304 defined at a second end.

The antenna bracket 3232 is identical to the antenna bracket 3032 of the apparatus 3010.

In order to assemble the upper mount assembly 3213, the intermediate member 3300 is attached via a first rotational joint 3306 for rotation about a first azimuth steering axis X' to the mount 3220. The antenna bracket 3232 is attached to the intermediate member 3300 via a further rotational joint 3308 for rotation about a second azimuth steering axis X".

Figure 23B:
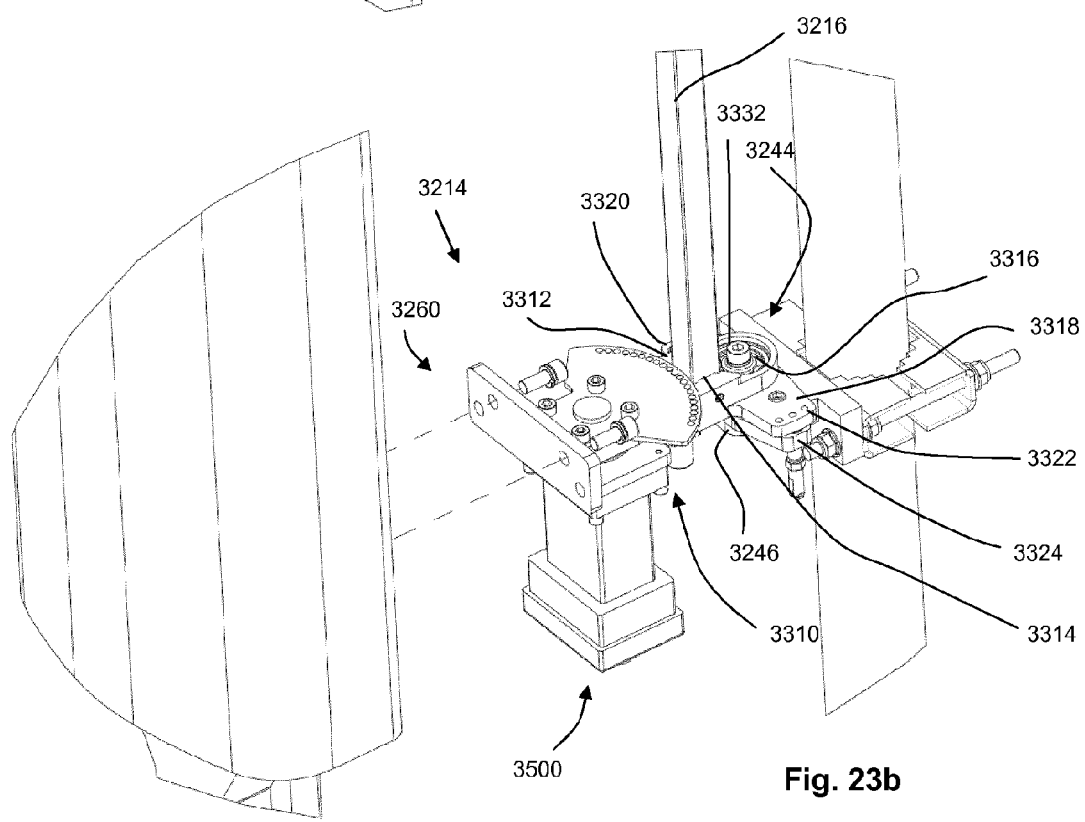

Turning to FIG. 23b, the lower mount assembly 3214 is shown in more detail. The lower mount assembly 3214 also comprises a mount 3244, an intermediate member 3310 and an antenna bracket 3260.

As with the upper mount assembly 3212, in the lower mount assembly 3214, the mount 3244 is substantially similar to the mount 3044 of the apparatus 3010, however, the body 3246 is somewhat shorter, having a joint receiving formation (not visible). The mount 3244 defines a pair of horizontal flanges 3324, 3326 extending either side of the joint receiving formation. The first flange 3324 comprises a vertically oriented pin receiving bore (not visible). The second flange 3326 defines an arcuate slot 3328 (see FIG. 24). The arcuate slot 3328 has a geometric centre aligned with the joint receiving formation.

The intermediate member 3310 comprises an elongate body 3312 which defines on its upper surface a square bore 3314 to receive the stability member 3216. At the first end of the body 3312 there is provided a mount joint receiving formation 3316. At either side of the mount joint receiving formation 3316 there are provided horizontal flanges 3318, 3320. The first horizontal flange 3318, at its outer periphery, defines three pin bores 3322 which are located at an equal radius about the centre of the mount joint receiving formation 3316. The second horizontal flange 3320 comprises a downwardly depending stop pin 3330. A bracket joint receiving formation (not visible) is provided at a second end of the body 3312.

The antenna bracket 3260 is identical to the bracket 3060 of apparatus 3010.

The intermediate member 3310 is pivotably attached to the mount 3244 via a rotational joint (not visible) fitted into the joint receiving formation in the mount 3244 and the mount joint receiving formation 3316 in the intermediate member 3310. Rotation occurs about the first azimuth steering axis X'. The stop pin 3330 slides in the arcuate slot 3328, and as well as guiding the relative motion of the two components prevents over actuation which may cause damage to the antenna 3218.

Figure 25:
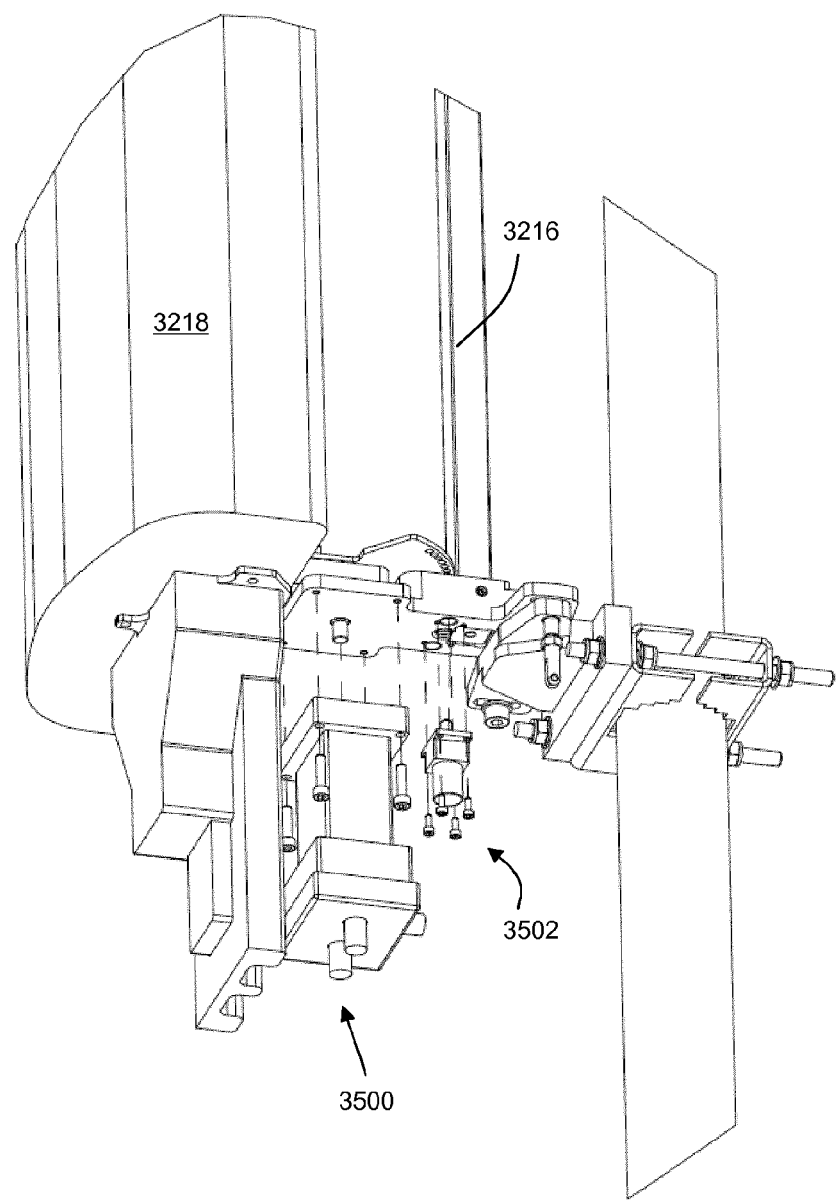
FIG. 25 is a detail, perspective view of a part of the antenna mounting apparatus as shown in FIG. 22a showing some additional parts.

The bracket 3260 is attached to the intermediate member via a rotational joint (not shown) between the bracket joint receiving formation of the intermediate member and the joint receiving formation of the bracket. Rotation occurs about second azimuth steering axis X". The rotation can be powered and locked in the same way as apparatus 10 using an appropriate drive apparatus 3500 and stop apparatus 3502 as shown in FIG. 25.

Figure 24:
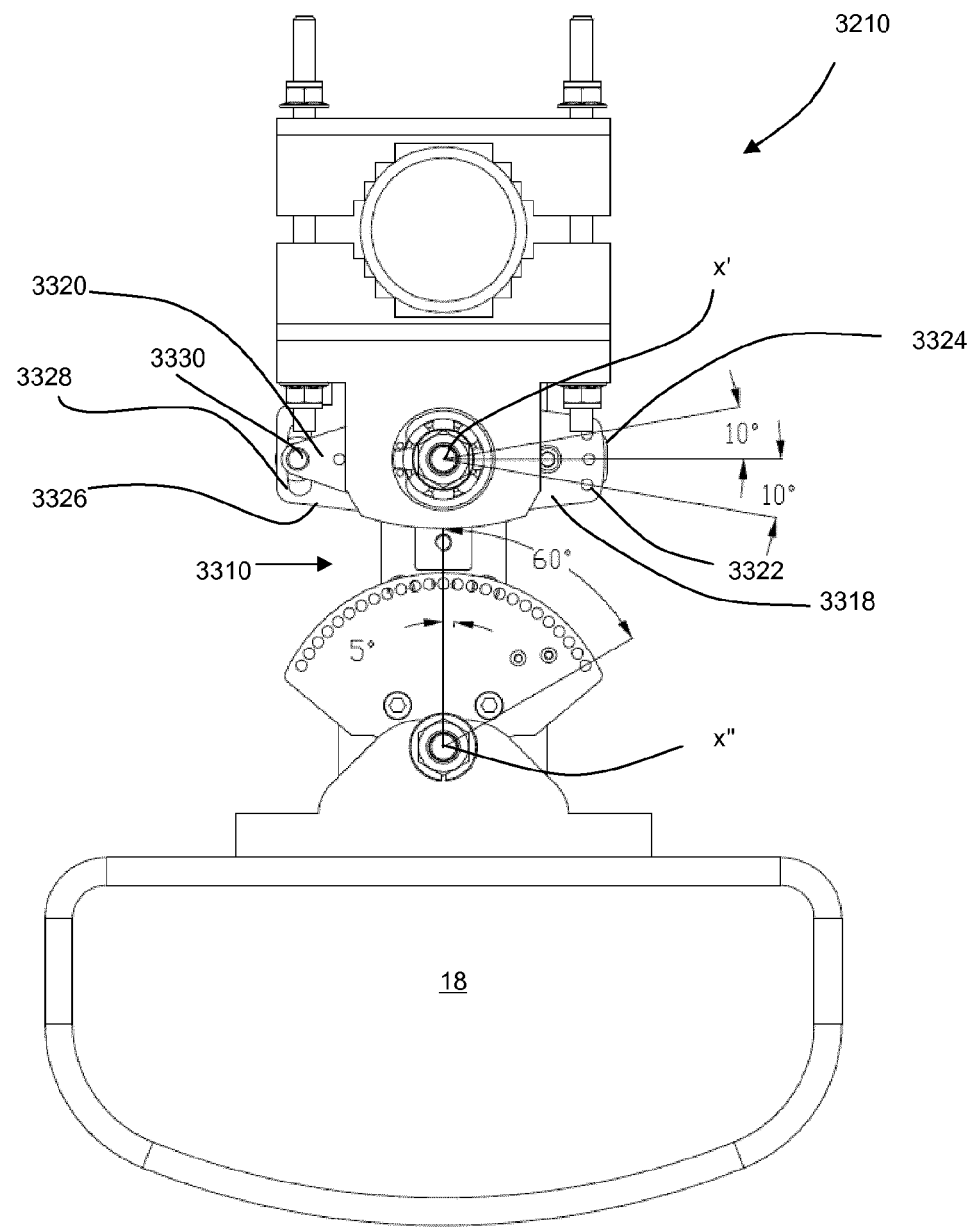

Turning to FIG. 24, as can be show there are two parallel articulation axes, X' and X" of the apparatus 3210. The three bores 3322 provided on the flange 3318 are spaced 10 degrees apart such that the intermediate member 3310 can be pivoted about the first azimuth steering axis X'. This provides an even greater range of motion for the antenna 3018 as it can now be steered by +/−60 degrees about axis X" and, in addition, a further +/−10 degrees about axis X'. In particular, this gives the antenna 3018 the ability to face further left or right depending on the requirements of the user.

Figure 26:
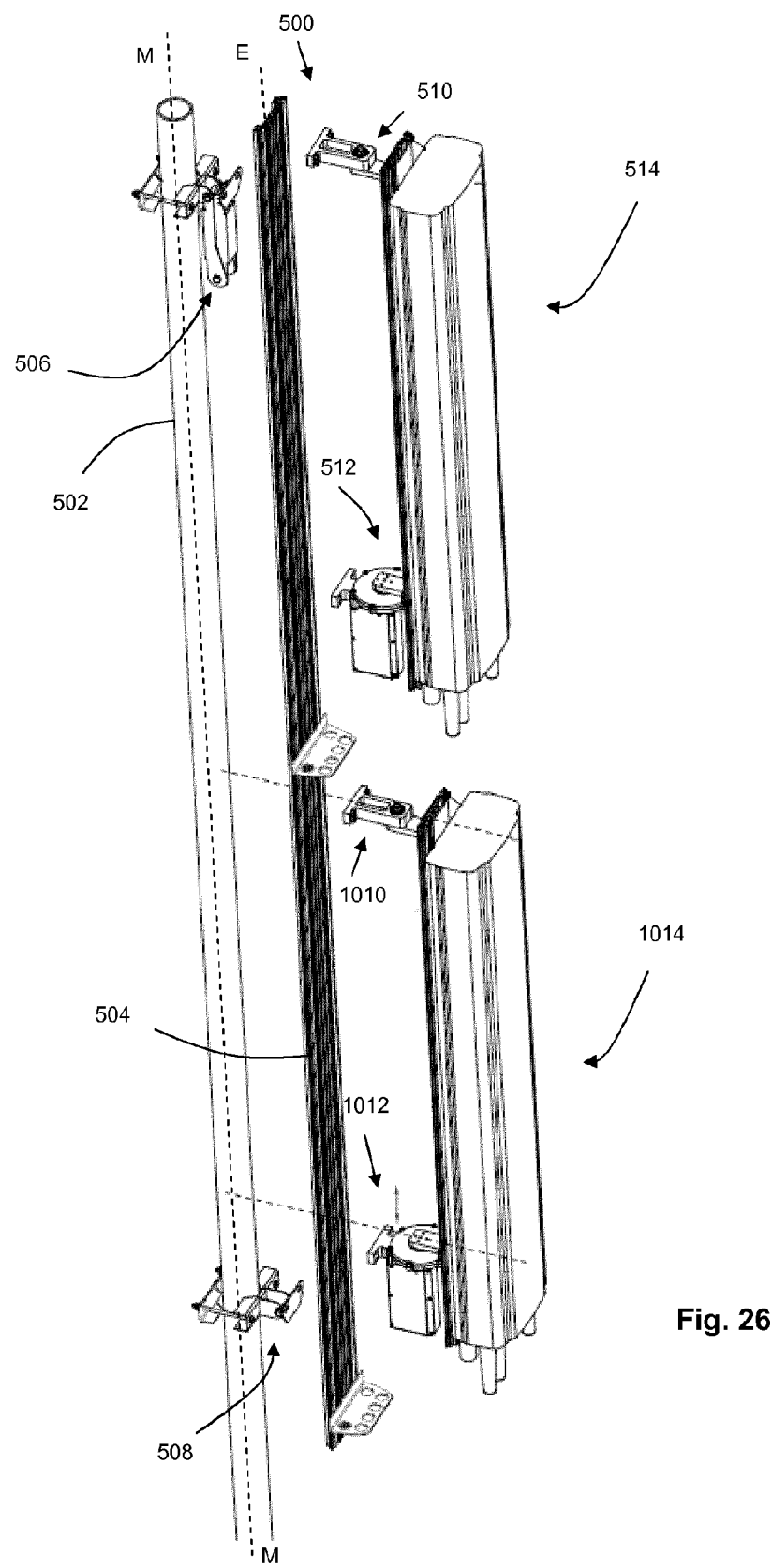
FIG. 26 is a perspective view of a fifth antenna mounting apparatus in accordance with the present invention.

Turning to FIG. 26, an assembly of an antenna mount 502, a first antenna assembly 514 and a second antenna assembly 1014 are shown, the first and second antenna assemblies 514, 1014 attached to the antenna mount 502 by an antenna mounting assembly 500 according to the present invention.

The antenna mount 502 has a mast axis M and is the same as the antenna mount 102. The first and second antenna assemblies 514, 714 are each the same as the antenna assembly 114.

The antenna mounting assembly 500 comprises:
 (i) a common reference frame 504, substantially the same as the reference frame 104, but longer in a long axis E;
 (ii) a tilt bracket 506;
 (iii) a pivot 508;
 (iv) a first antenna mount 510 the same as the first antenna mount 110;
 (v) a second antenna mount 512 the same as the second antenna mount 112;
 (vi) a third antenna mount 1010 the same as the first antenna mount 110; and,
 (vii) a fourth antenna mount 1012 the same as the second antenna mount 112.

It will be noted that the antenna assemblies 514, 1014 are connected to the same reference frame 504, and as such they share a datum orientation, as the antenna mounts 510, 512, 1010, 1012 can only be attached to the reference frame in a predetermined orientation. As such, using the rotary encoders sensors embedded in the joints of the second and fourth antenna mounts 510, 1010, the antenna assemblies 514, 1014 can be accurately aligned for MIMO applications. Advantageously, the extruded nature of the reference frame 504 allows the antenna assemblies to be moved in direction E to set the ideal spacing between their respective top dipoles, which for MIMO applications is greater than or equal to 10 wavelengths of the radiation emitted/received. For example for a 700 MHz signal this is 4.29 m, or for 1800

MHz it is 1.67 m. Generally, cellular communication is in the 700 to 3000 MHz order of magnitude.

Figure 27A:
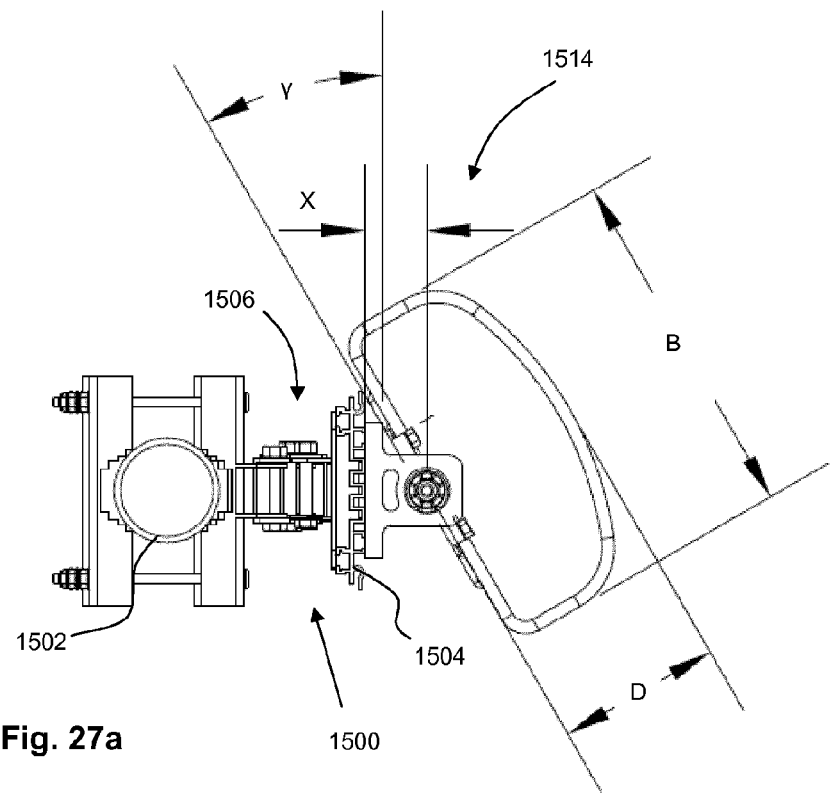
FIGS. 27a and 27b are plan views of a sixth antenna mounting apparatus in accordance with the present invention.
Figure 27B:
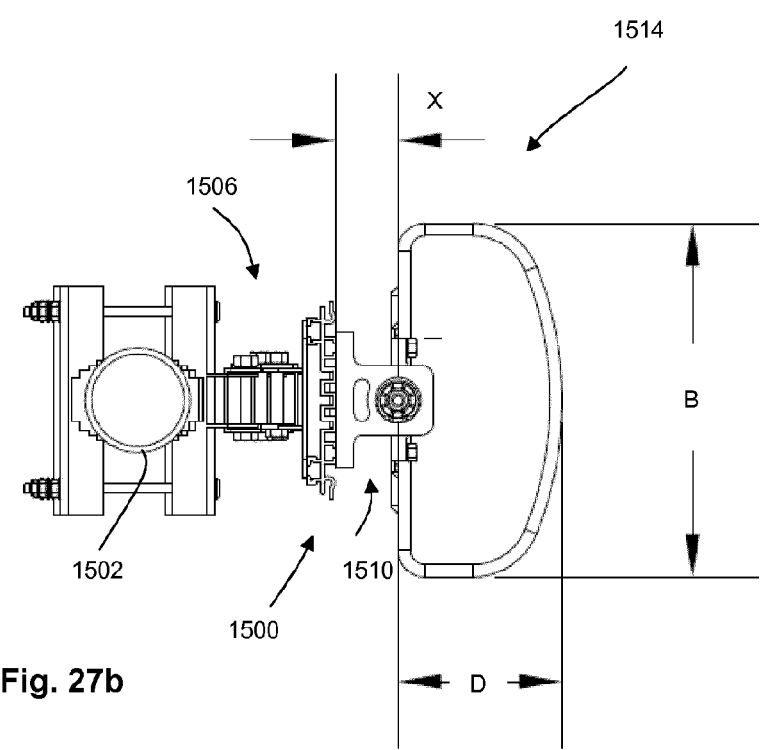
Figure 28A:
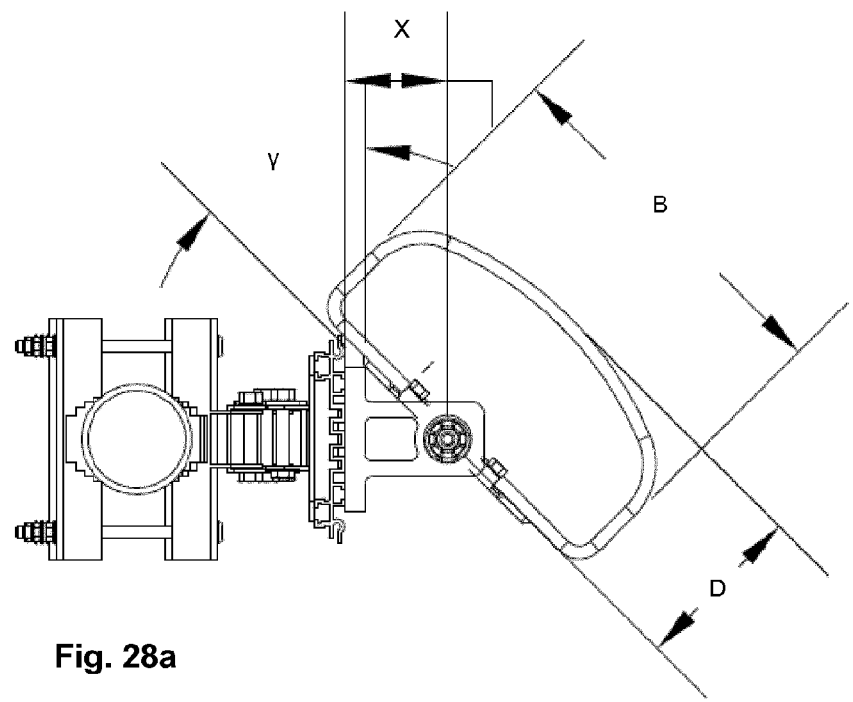
FIGS. 28a and 28b are plan views of a seventh antenna mounting assembly in accordance with the present invention.
Figure 28B:
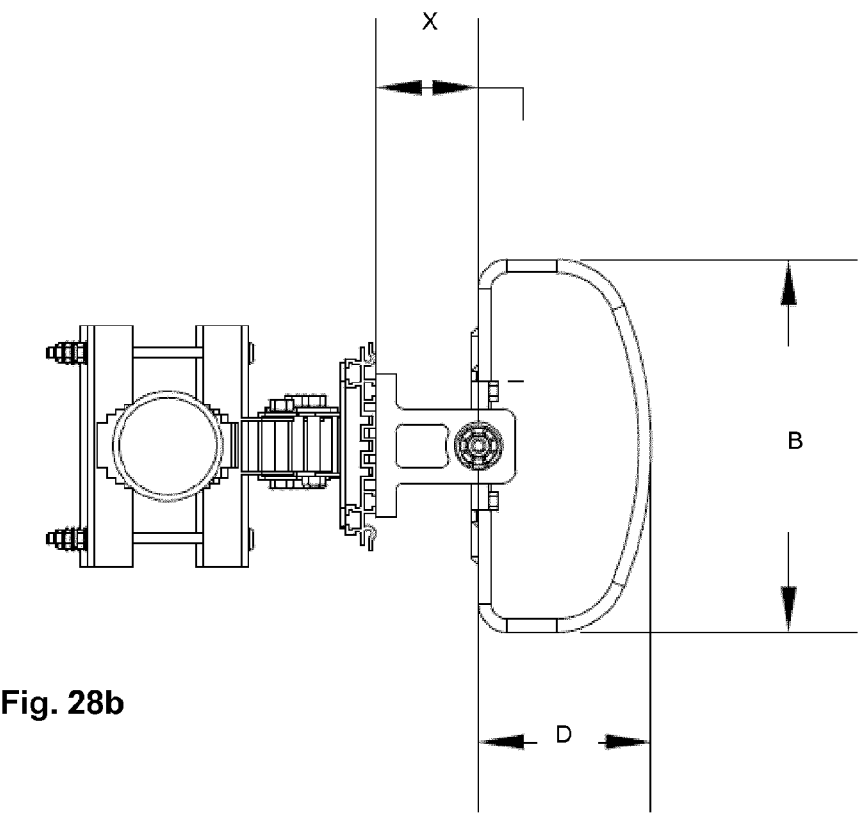
Figure 29A:
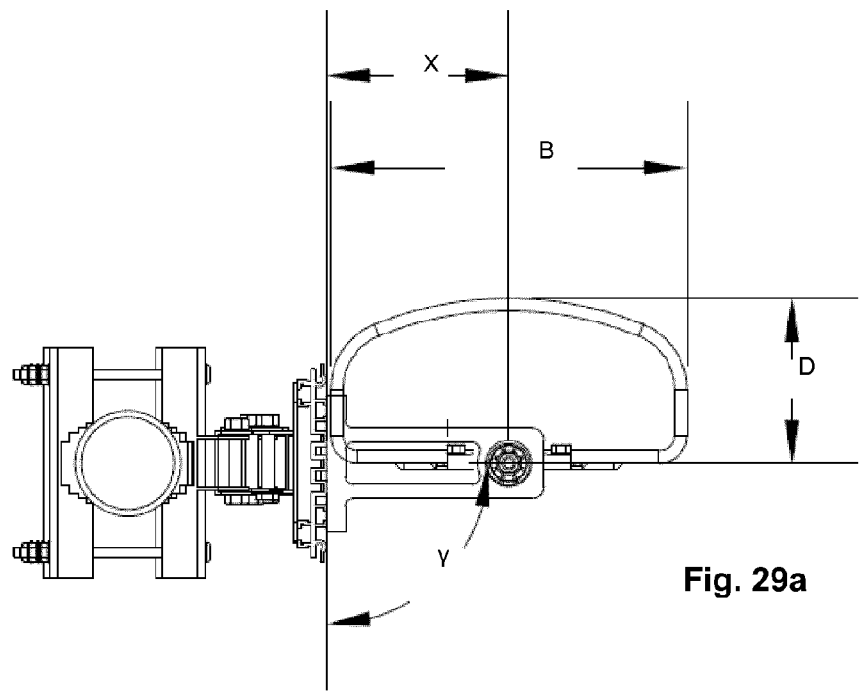
FIGS. 29a and 29b are plan views of a eighth antenna mounting assembly in accordance with the present invention.
Figure 29B:
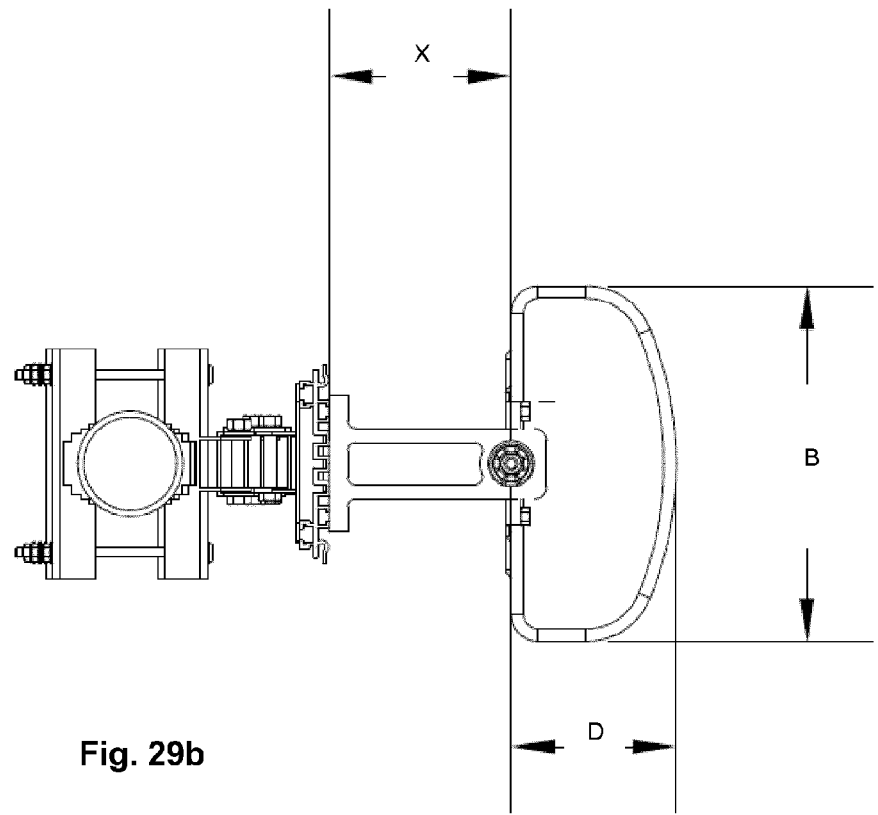

Turning to FIGS. 27a and 27b, an assembly of an antenna support 1502 and a first antenna assembly 1514 is shown, attached by an antenna mounting assembly 1500 according to the present invention.

The antenna assembly comprises an antenna having a breadth B and a depth D.

The antenna mounting assembly 1500 comprises a reference frame 1504 attached to the antenna support 1502 by a tilt bracket 1506. The arrangement is similar to the assembly 1500.

The distance X between the reference frame 1504 and the axis of rotation of the antenna assembly 1514 is such that due to the breadth B of the antenna assembly 1514 the maximum rotation angle γ is 30 degrees.

By altering the distance X as shown in FIGS. 28a, 28b, 29a, 29b, the angle γ can be increased to 45 and 90 degrees respectively. γ=90 degrees when X=B/2.

Figure 30:
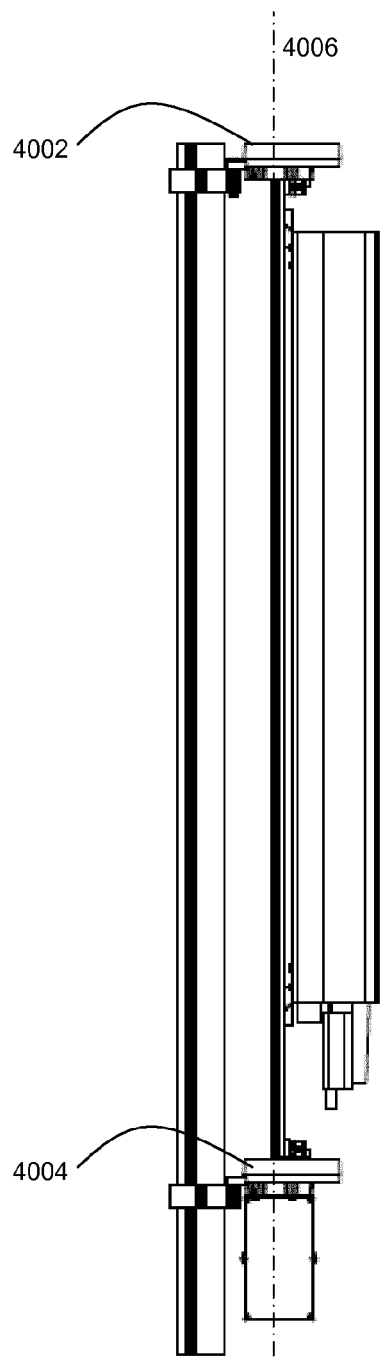
FIG. 30 is a side view of a ninth antenna mounting assembly in accordance with the present invention; and, FIG. 31 is a side view of a tenth antenna mounting assembly in accordance with the present invention.
Figure 31:
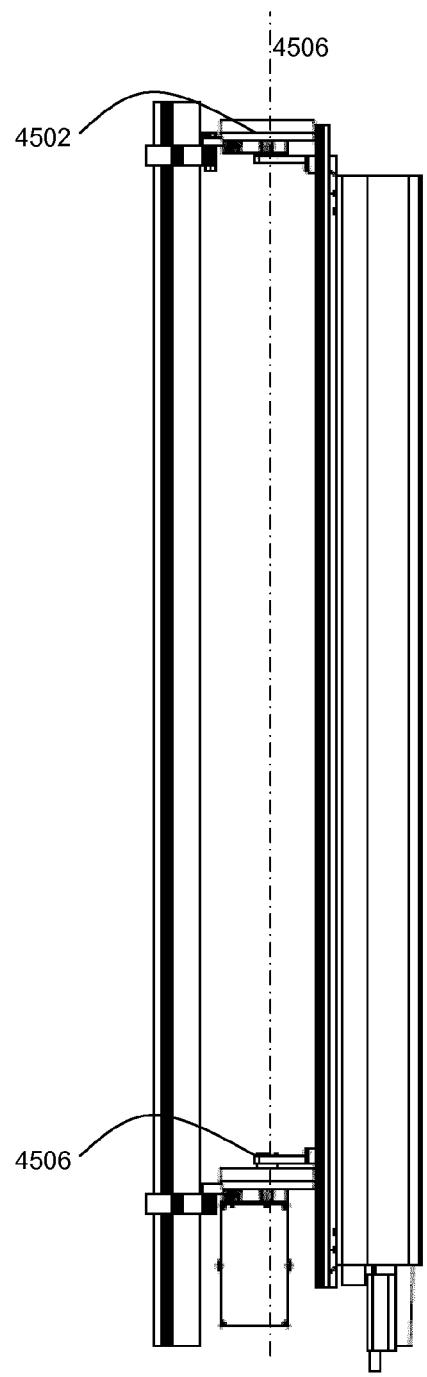

Turning to FIGS. 30 and 31, two different assemblies 4000 and 4500 are shown. The assembly 4000 comprises a first and second spaced apart mount 4002, 4004 with a common axis of azimuth rotation 4006. The assembly 4500 comprises a first and second spaced apart mount 4502, 4504 with a common axis of azimuth rotation 4506.

The assembly 4000 comprises an antenna assembly 4008, and the assembly 4500 comprises an antenna assembly 4508. In the assembly 4000, the axis 4006 is coincident with the antenna assembly 4008. This makes for a compact assembly in the horizontal direction, but at the expense of a long vertical arrangement, By contrast, in the assembly 4500, the axis 4506 is midway between the relevant antenna mount and the antenna assembly 4508, which makes the system larger in the horizontal sense, but more compact in the vertical sense (such that a much larger antenna can fit in to the same space envelope per FIG. 31).

Variations fall within the scope of the present invention.

Actuation and stopping about the steering axis X' may be automated in addition to the steering about axis X". This may involve a further motor and stop apparatus driven by the local control unit.

Various embodiments have been described herein, but the skilled addressee will understand that the various components, systems and methods are interchangeable between embodiments.

The invention claimed is:

1. A method of modifying an existing cellular antenna base station, comprising the steps of:
   providing an existing cellular antenna base station comprising a mast;
   providing a reference frame;
   providing a global orientation and position measurement device;
   measuring a global orientation of the reference frame about a first axis using the global orientation and position measurement device;
   removing the global orientation and position measurement device, leaving the reference frame in-situ;
   providing an antenna mounting assembly having an antenna bracket, the antenna mounting assembly comprising a rotational joint and a first locking mechanism, the first locking mechanism comprising:
      a plate connected to one of the mast and the antenna mounting bracket, the plate comprising a plurality of spaced-apart openings, and
      a locking pin connected to the other of the mast and the antenna mounting bracket, the locking pin configured to move between an unlocked condition and a locked condition in which the locking pin engages one of the plurality of openings in the plate to prevent movement of the rotational joint, and
   wherein the antenna mounting assembly is configured to allow movement and locking of the antenna bracket in a plurality of predetermined angular positions about the first axis with respect to the mast; and,
   attaching an antenna to the antenna bracket.

2. The method of claim 1, in which the existing cellular antenna base station comprises a tilt bracket attached to the mast, and the step of providing the reference frame comprises the step of attaching the reference frame to the tilt bracket.

3. The method of claim 1, in which the existing cellular antenna base station comprises the antenna attached to the mast.

4. A method according to claim 1, comprising the steps of:
   providing a sensor on the antenna mounting assembly, the sensor configured to measure the position of the antenna bracket relative to the mast providing an azimuth steering assembly comprising the rotational joint;
   steering the antenna using the azimuth steering assembly;
   determining the absolute heading of the antenna using the measured position of the reference frame combined with data provided by the sensor.

5. A method according to claim 1, comprising the steps of:
   providing a further antenna;
   attaching the further antenna to the reference frame.

6. The method of modifying an existing cellular antenna base station according to claim 1, in which:
   the antenna is a directional cellular communications antenna; and
   the method further comprises the steps of:
      providing a further antenna mounting assembly, spaced apart from the antenna mounting assembly, the further antenna mounting assembly having a further antenna bracket, the further antenna mounting assembly comprising a further rotational joint and a further first locking mechanism comprising a further plate and a further locking pin engageable with the further plate to prevent movement of the further rotational joint;
   wherein the rotational joint and the further rotational joint are aligned on a substantially vertical axis in use to provide azimuth steering of the directional cellular communications antenna.

7. The method of claim 2, in which the existing cellular antenna base station comprises an antenna mount attached to the tilt bracket, and the step of providing the reference frame comprises the step of attaching the reference frame to the antenna mount.

8. An antenna mounting apparatus comprising:
   a first mount,
   an antenna mounting bracket attached to the first mount via a first rotational joint to allow rotation about a first, azimuth steering, axis in use;
   the first rotational joint comprising: a first locking mechanism arranged to lock the first rotational joint against rotation, the first locking mechanism comprising:
      a plate connected to one of the first mount and antenna mounting bracket, the plate comprising a plurality of spaced-apart openings; and
      a locking pin connected to the other of the first mount and antenna mounting bracket, in which the locking pin is arranged to move between an unlocked condition and a locked condition in which it engages one of the plurality of openings in the plate to prevent movement of the rotational joint.

9. An antenna mounting apparatus according to claim 8, in which the plurality of spaced-apart openings are circumferentially spaced around the first, azimuth steering, axis at a first radius.

10. An antenna mounting apparatus according to claim 8, in which the locking pin is linearly actuable.

11. An antenna mounting apparatus according to claim 8, comprising a rotary sensor arranged to determine the articulation of the first rotational joint.

12. The antenna mounting apparatus according to claim 8, wherein the locking pin is actuated by an electric actuator.

13. The antenna mounting apparatus according to claim 8, further comprising an electric steering actuator arranged to rotate the antenna mounting bracket relative to the first mount.

14. An antenna mounting apparatus according to claim 10, in which the locking pin is resiliently biased to a locked condition.

15. An antenna mounting apparatus according to claim 11, wherein the first rotational joint comprises an interface plate defining:

a drive interface for articulating the joint,
a locking interface for selectively locking the joint using the first locking mechanism, and
a rotary sensor interface arranged to provide an output reading from the rotary sensor.

16. An antenna mounting apparatus according to claim 15, in which each interface of the interface plate faces in a common direction.

17. An antenna mounting apparatus according to claim 15 in which the interface plate defines an actuator mounting formation for attachment of an actuator housing to engage an actuator output shaft with the drive interface in use.

18. An antenna mounting apparatus according to claim 15, in which the first rotational joint comprises a sealed housing containing the first locking mechanism and the rotary sensor.

19. An antenna mounting apparatus according to claim 16, in which the common direction is towards the ground in use.

20. An antenna mounting apparatus according to claim 18, in which the sealed housing is sealed to an IP rating, preferably an IP rating of at least IP67.

* * * * *